(12) United States Patent
DeMersseman et al.

(10) Patent No.: US 12,204,050 B2
(45) Date of Patent: Jan. 21, 2025

(54) SCANNING ASSEMBLY FOR A DETECTION SYSTEM

(71) Applicant: Magna Electronics, LLC, Southfield, MI (US)

(72) Inventors: Bernard DeMersseman, Southfield, MI (US); Robert Sletten, Southfield, MI (US); Aaron Cahill, Southfield, MI (US); Patrick Holmes, Southfield, MI (US)

(73) Assignee: Magna Electronics, LLC, Southfield, MI (US)

( * ) Notice: Subject to any disclaimer, the term of this patent is extended or adjusted under 35 U.S.C. 154(b) by 1176 days.

(21) Appl. No.: 17/010,919

(22) Filed: Sep. 3, 2020

(65) Prior Publication Data

US 2020/0400789 A1    Dec. 24, 2020

Related U.S. Application Data

(63) Continuation-in-part of application No. 16/131,857, filed on Sep. 14, 2018, now Pat. No. 11,307,294.

(51) Int. Cl.
*G01C 3/08* (2006.01)
*B60W 30/02* (2012.01)
*G01S 7/481* (2006.01)
*G06V 20/58* (2022.01)

(52) U.S. Cl.
CPC ........... *G01S 7/4817* (2013.01); *B60W 30/02* (2013.01); *G01S 7/4813* (2013.01); *G06V 20/58* (2022.01); *B60W 2420/408* (2024.01)

(58) Field of Classification Search
CPC ...... G01S 7/4817; G01S 17/93; G01S 7/4813; G01S 7/4812; G01S 17/42; G02B 26/105; G02B 7/1821; G02B 26/101; G05D 1/0231; B60W 30/02; B60W 2420/408; G06V 20/58; G06V 2201/12
See application file for complete search history.

(56) References Cited

U.S. PATENT DOCUMENTS

| | | |
|---|---|---|
| 5,793,491 A | 8/1998 | Wangler |
| 6,146,044 A | 11/2000 | Calvet |
| 6,879,420 B2 | 4/2005 | Tominaga et al. |

(Continued)

FOREIGN PATENT DOCUMENTS

| | | |
|---|---|---|
| CN | 107167787 A | 9/2017 |
| CN | 107942473 A | 4/2018 |

(Continued)

OTHER PUBLICATIONS

International Search Report and Written Opinion for PCT/US2019/048783, 16 pages, mailed Nov. 7, 2019.

*Primary Examiner* — Samantha K Nickerson
(74) *Attorney, Agent, or Firm* — Matthew D. Thayne; Thayne and Davis LLC

(57) ABSTRACT

A scanning assembly for a detection system for a vehicle includes a base, a first and second flexible sheet, and a scanning fixture with a mirror. The scanning fixture is connected to the base via the first flexible sheet and the second flexible sheet. Oscillation of the scanning assembly around a first central axis of the scanning fixture causes each flexible sheet to flex along a length of a plane of said sheet. Oscillation of the scanning assembly around a second central axis of the scanning fixture causes each flexible sheet to flex in torsion along the length of the plane of the sheet.

15 Claims, 22 Drawing Sheets

(56) References Cited

U.S. PATENT DOCUMENTS

| | | | |
|---|---|---|---|
| 7,813,019 B2 | 10/2010 | Hirata et al. | |
| 7,940,443 B2 | 5/2011 | Maeno et al. | |
| 8,035,875 B2 | 10/2011 | Shigematsu et al. | |
| 8,072,663 B2 | 12/2011 | O'Neill et al. | |
| 8,164,811 B2 | 4/2012 | Shigematsu et al. | |
| 8,752,969 B1 | 6/2014 | Kane | |
| 9,063,549 B1 | 6/2015 | Pennecot et al. | |
| 9,869,754 B1 | 1/2018 | Campbell et al. | |
| 2005/0046979 A1 | 3/2005 | Hiley et al. | |
| 2005/0078345 A1 | 4/2005 | Turner et al. | |
| 2009/0002678 A1 | 1/2009 | Tanaka et al. | |
| 2009/0225382 A1 | 9/2009 | Miller | |
| 2013/0200158 A1 | 8/2013 | Feng | |
| 2018/0196257 A1 | 7/2018 | Ostaszewski | |

FOREIGN PATENT DOCUMENTS

| | | |
|---|---|---|
| JP | 2011227216 A | 11/2011 |
| WO | WO2006096156 A1 | 9/2006 |
| WO | WO2013080626 A1 | 6/2013 |

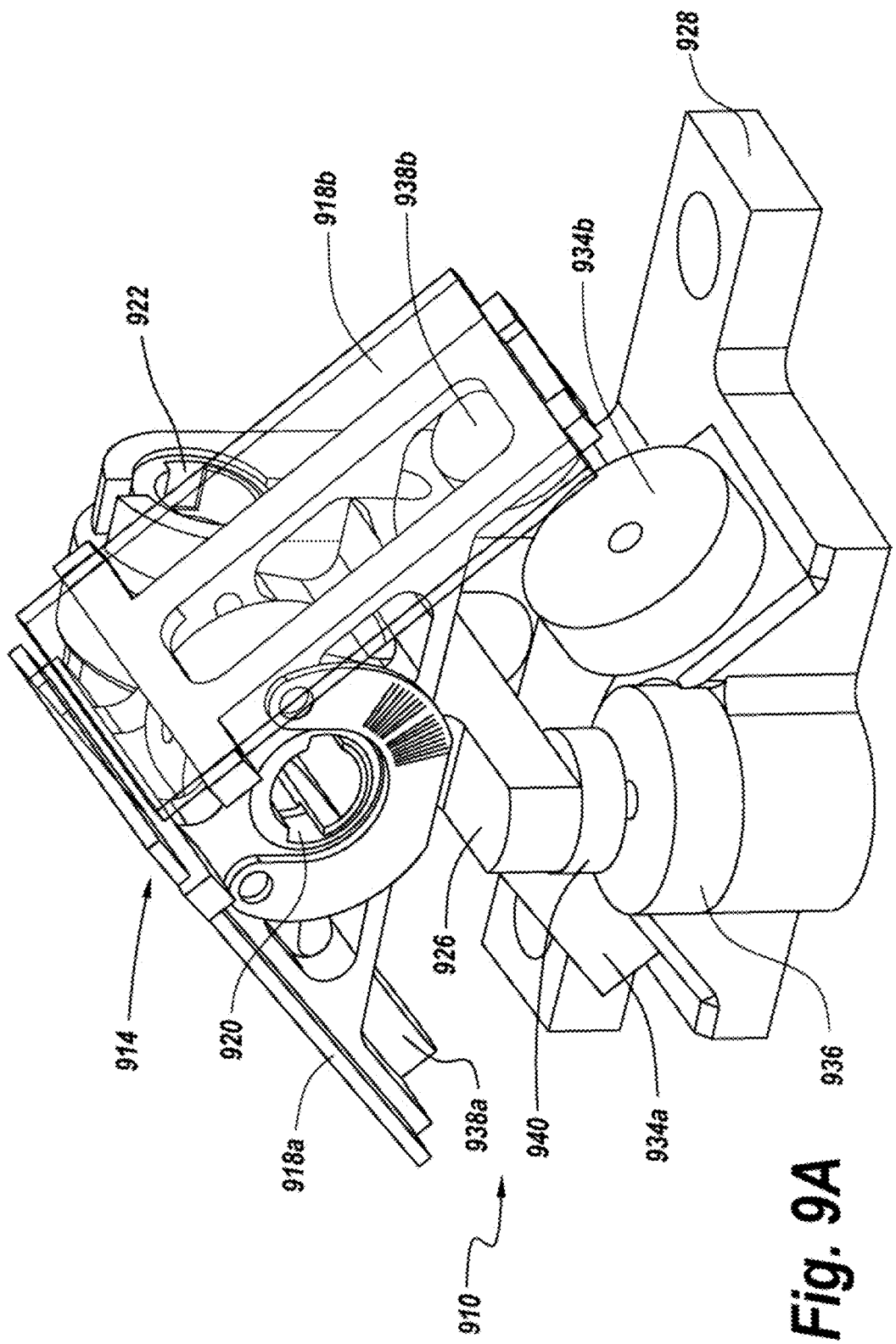

SCANNING ASSEMBLY FOR A DETECTION SYSTEM

CROSS REFERENCE TO RELATED APPLICATIONS

This application claims priority to and the benefit of: U.S. patent application Ser. No. 16/131,857, filed on Sep. 14, 2018, and titled "SCANNING ASSEMBLY FOR A DETECTION SYSTEM", the contents of which are incorporated herein by reference as though fully set forth herein.

FIELD OF THE INVENTION

The subject disclosure relates to object detection and more particularly to scanning assemblies for detection systems for vehicles.

BACKGROUND OF THE INVENTION

Vehicles often include detection systems which can be used for collision avoidance, self-driving, cruise control, and the like. For an effective detection system, it is important to combine a wide field of in both the horizontal and vertical direction with long range and high resolution. However, limited space and cost considerations can often limit the range, resolution, and/or accuracy of a detection system.

Scanning assemblies can be employed in typical detection systems, such as LiDAR systems, to change the field of view of the detection system with respect to the environment. A scanning assembly can therefore increase the field of view of the detection assembly without the need to include additional expensive components within the LiDAR system itself, such as transmitters and receivers. However, vibration and shock felt by the vehicle can often have a detrimental impact on systems which include scanning assemblies resulting in corresponding inaccuracies in the detection system. Cost and space considerations on vehicles make it difficult to address these problems in devices which can be effectively implemented on a vehicle. Therefore there is a need for a detection system which is cost effective and accurate for detecting objects in an environment around a vehicle.

SUMMARY OF THE INVENTION

In light of the needs described above, in at least one aspect, there is a need for a scanning assembly which can be implemented in a detection system, such as a LiDAR system, which is cost effective, reliable, and not particularly susceptible to vibrations felt by the corresponding vehicle.

In at least one aspect, the subject technology relates to a scanning assembly for a detection system for a vehicle. The assembly includes a scanning fixture including a first mirror, the scanning fixture attached to a first pivot elongated along a first axis. The first mirror has a reflective surface providing a first field of view between the detection system and a surrounding environment, rotation of the first pivot around the first axis turning the first mirror to change the first field of view in a first direction. A central member has a first end attached to the first pivot and a second end attached to a second pivot to couple the first pivot to the second pivot, the second pivot being elongated along a second axis orthogonal to the first axis. A base is configured to attach the scanning assembly to the vehicle. The base is attached to the second pivot and maintains the second pivot in a position elongated along the second axis, rotation of the second pivot around the second axis turning the first mirror to change the first field of view in a second direction. The scanning fixture is coupled to the base exclusively through attachment of the first pivot to the second pivot via the central member, the second pivot in turn being attached to the base.

In some embodiments the first pivot includes a first section and a second section attached to the first section via a first flexible sheet, the first flexible sheet elongated along the first axis such that rotation of the first pivot around the first axis causes the first flexible sheet to bend in torsion, the first flexible sheet forming a first plane and resisting movement of the first section with respect to the second section along the first plane. The first pivot can be coupled to the first mirror via the first section. Further, the first pivot can then be attached to the central member via the second section. In some embodiments, the second pivot includes a third section and a fourth section attached to the third section via a second flexible sheet, the second flexible sheet elongated along the second axis such that rotation of the second pivot around the second axis causes the second flexible sheet to bend in torsion, the second flexible sheet forming a second plane and resisting movement of the third section with respect to the fourth section along the second plane. The second pivot can then be attached to the base via the third section and the second pivot can be attached to the central member via the fourth section.

In some embodiments, the first pivot includes a first central cylinder disposed between first and second cylinder ends. The first central cylinder can include a first central arcuate member extending into the first and second cylinder ends. The first central arcuate member can be immovably fixed to the first central cylinder and rotatable within the first and second cylinder ends around the first axis. The assembly can further include a first end arcuate member immovably fixed to the first and second cylinder ends, the first end arcuate member rotatable within the first central cylinder around the first axis. A first flexible sheet can attach the first end arcuate member to the first central arcuate member, the first flexible sheet elongated along the first axis such that rotation of the first pivot around the first axis causes the first flexible sheet to bend in torsion, the first flexible sheet forming a first plane and resisting movement of the first central cylinder with respect to the first and second cylinder ends along the first plane. Additionally, a second flexible sheet can attach the first central arcuate member to the first end arcuate member, the second flexible sheet elongated along the first axis such that rotation of the first pivot around the first axis causes the second flexible sheet to bend in torsion, the second flexible sheet forming a second plane and resisting movement of the first central cylinder with respect to the first and second cylinder ends along the second plane. In some embodiments, the second pivot includes a second central cylinder disposed between third and fourth cylinder ends. The second central cylinder can include a second central arcuate member extending into the third and fourth cylinder ends, the second central arcuate member immovably fixed to the second central cylinder and rotatable within the third and fourth cylinder ends around the second axis. A second end arcuate member can be immovably fixed to the third and fourth cylinder ends and rotatable within the second central cylinder around the second axis. The system can also include a third flexible sheet attaching the second end arcuate member to the second central arcuate member, the third flexible sheet elongated along the second axis such that rotation of the second pivot around the second axis causes the third flexible sheet to bend in torsion. The third flexible sheet can form a third plane and resist movement of the second central cylinder with respect to the third and fourth cylinder ends along the third plane. Further, a fourth flexible sheet can attach the second central arcuate member to the second end arcuate member, the fourth flexible sheet elongated along the second axis such that rotation of the second pivot around the second axis causes the fourth flexible sheet to bend in torsion. The fourth flexible sheet can form a fourth plane and resist movement of the second central cylinder with respect to the third and fourth cylinder ends along the fourth plane.

In some embodiments, the first flexible sheet attaches to the first central arcuate member at locations within the first and second cylinder ends and the second flexible sheet attaches to the first end arcuate member at a location within the first central cylinder. The second pivot can be attached to the base via base clamps of the base. The base clamps can be attached to the third and fourth cylinder ends of the second pivot. Further, the second central cylinder of the second pivot can be attached to the central member via a first end clamp of the central member. In some embodiments, the first central cylinder of the first pivot is attached to the central member via a second end clamp of the central member and the first mirror is attached to the first pivot via fastener clamps of the scanning fixture. The fastener clamps can be attached to the first and second cylinder ends of the first pivot.

In some cases, the first plane is substantially orthogonal to the second plane and the third plane is substantially orthogonal to the fourth plane. A first permanent magnet can be fixed on a first side of the scanning fixture. A second permanent magnet can be fixed on a second side of the scanning fixture. The first pivot can be located between the first side and the second side of the scanning fixture. A first electromagnet can be attached to the base and configured to apply a force to the first permanent magnet to selectively push or pull the first mirror to change the first field of view in the first direction via rotation of the first pivot. A second electromagnet can be attached to the base and configured to apply a force to the second permanent magnet to selectively push or pull the first mirror to change the first field of view in the first direction via rotation of the first pivot. In some embodiments, the system can include a third permanent magnet fixed to the central member. A third electromagnet can be attached to the base and configured to apply a force to the third permanent magnet to selectively push or pull the central member, turning the first mirror to change the first field of view in the second direction via rotation of the second pivot.

In some embodiments, the first pivot includes at least one flexible sheet configured to flex in torsion when a first section of the first pivot rotates, with respect to a second section of the first pivot, around the first axis. The second pivot can include at least one flexible sheet configured to flex in torsion when a third section of the second pivot rotates, with respect to a fourth section of the second pivot, around the second axis. In some cases, the first pivot includes two flexible sheets and the second pivot includes two flexible sheets.

In some embodiments, the first mirror can be located on a first side of the first pivot and the scanning fixture can include a second mirror on an opposing side of the first pivot. The second mirror can be askew of the first mirror, the second mirror having a second reflective surface providing a second field of view between the detection system and the surrounding environment. In some cases, the first mirror interfaces with a first transmitter and receiver array of the detection system to define the first field of view. The second mirror can then interface with a second transmitter and receiver array of the detection system to define the second field of view.

In at least one aspect, the subject technology relates to a scanning assembly for a detection system for a vehicle including a scanning fixture having a mirror. The mirror is attached to a first pivot for rotation of the mirror around a first axis. Rotation of the mirror around the first axis changes a field of view of the detection system to perform an azimuth scan of a surrounding environment. A central member attaches a second pivot to the first pivot for rotation of the mirror around a second axis. The second axis is orthogonal to the first axis. Rotation of the mirror around the second axis changes the field of view of the detection system to perform an elevation scan of the surrounding environment. A base is attached to the second pivot and the vehicle. A first permanent magnet is fixed on a first side of the scanning fixture. A second permanent magnet is fixed on a second side of the scanning fixture opposite the first side, wherein the first pivot is between the first and second sides of the scanning fixture. A first electromagnet is attached to the base and configured to apply a force to the first permanent magnet to selectively push or pull the mirror to change the field of view via rotation of the first pivot to perform the azimuth scan. A second electromagnet is attached to the base and configured to apply a force to the second permanent magnet to selectively push or pull the mirror to change the field of view via rotation of the first pivot to perform the azimuth scan. A third permanent magnet is fixed to the central member. A third electromagnet is attached to the base and configured to apply a force to the third permanent magnet to selectively push or pull the central member to change the field of view via rotation of the second pivot to perform the elevation scan. The mirror is configured to operate in a resonant mode such that the mirror oscillates around the first axis at a first oscillation frequency and the mirror oscillates around the second axis at a second oscillation frequency, a ratio of the first oscillation frequency to the second oscillation frequency being irrational.

In some embodiments, in resonant mode, the ratio of the first oscillation frequency to the second oscillation frequency is substantially between 0.10 and 0.15. In some cases, in resonant mode, the first oscillation frequency is substantially 30 Hz and the second oscillation frequency is substantially 200 Hz. In other cases, in resonant mode, the first oscillation frequency is substantially 20 Hz and the second oscillation frequency is substantially 190 Hz. In some cases, the ratio of the first oscillation frequency to the second oscillation frequency produces a Lissajou pattern.

In at least one aspect, the subject technology relates to a scanning assembly for a vehicle, the scanning assembly having a base configured to attach the scanning assembly to the vehicle. The base is attached to a first pivot at a first section of the first pivot, the first pivot being elongated along a first axis for rotation around the first axis. The assembly includes a scanning fixture including a mirror attached to a second section of the first pivot, the mirror having a reflective surface providing a field of view between the detection system and a surrounding environment. Rotation of the first pivot around the first axis turns the mirror to change the field of view in a first direction. The first section includes a first arcuate member immovably fixed within the first section and rotatable within the second section around the first axis. The second section includes a second arcuate member immovably fixed within the second section and rotatable within the first section around the first axis. A first flexible sheet attaches the first arcuate member to the second arcuate member, the first flexible sheet elongated along the first axis such that rotation of the first pivot around the first axis causes the first flexible sheet to bend in torsion. The first flexible sheet forms a first plane and resists movement of the first section and the second section along the first plane.

In some embodiments, the assembly includes a first permanent magnet fixed on a first side of the scanning fixture. A second permanent magnet can be fixed on a second side of the scanning fixture. The first pivot can be located being between the first side and the second side of the scanning fixture. A first electromagnet can be attached to the base and configured to apply a force to the first permanent magnet to selectively push or pull the mirror to change the field of view in the first direction via rotation of the first pivot. A second electromagnet can be attached to the base and configured to apply a force to the second permanent magnet to selectively push or pull the mirror to change the field of view in the first direction via rotation of the first pivot.

In at least one aspect, the subject technology relates to a scanning assembly for a detection system for a vehicle with a base, a scanning fixture, and first and second flexible sheets. The base is configured to attach the scanning assembly to the vehicle. The scanning fixture includes a mirror having a reflective surface, the mirror having a first central axis and a second central axis running orthogonal to the first central axis. The first flexible sheet extends along a first plane between a first end and a second end of the first flexible sheet. The first end is attached to the scanning assembly on a first side of the first central axis and the second end is attached to the base on a second side of the first central axis, the second side opposite the first side. The second flexible sheet is elongated along a second plane between a third end and a fourth end of the second flexible sheet. The third end is attached to the scanning assembly on the second side of the first central axis and the fourth end is attached to the base on the first side of the first central axis. The first flexible sheet is configured to flex along the first plane when the scanning assembly oscillates around the first central axis. The second flexible sheet is configured to flex along the second plane when the scanning assembly oscillates around the first central axis. The first flexible sheet and the second flexible sheet are elongated in the direction of the second central axis such that the first flexible sheet and second flexible sheet flex in torsion when the scanning assembly oscillates around the second central axis.

In some embodiments, the first flexible sheet includes a first central cutout region and the second flexible sheet includes a second central cutout region aligned with the first central cutout region of the first flexible sheet. In some cases, the first central cutout region of the first flexible sheet has a planar width less than or equal to half a width of the first end of the first flexible sheet. Further, the second central cutout region of the second flexible sheet can have a planar width less than or equal to half a width of the third end of the second flexible sheet.

In some embodiments, the scanning assembly is configured to operate is a resonant mode. In the resonant mode, the mirror oscillates at a first oscillation frequency around the first central axis to change a first angle of the reflective surface between −15 degrees and 15 degrees, the first oscillation frequency being in the range of 10-20 Hz. In the resonant mode, the mirror also oscillates at a second oscillation frequency around the second central axis to change a second angle of the reflective surface between −5 degrees and 5 degrees, the second oscillation frequency being in the range of 100-200 Hz.

In at least one aspect, the subject technology relates to a scanning assembly for a detection system for a vehicle, the system having a base, a scanning fixture, electromagnets, and two flexible sheets. The base is configured to attach the scanning assembly to the vehicle. The scanning fixture includes a mirror having a reflective surface. The scanning fixture also includes permanent magnets, including a first permanent magnet coupled to the mirror on a first side of a first central axis. A second permanent magnet is coupled to the mirror on a second side of the first central axis, the second side opposite the first side. A third permanent magnet is coupled to the mirror on a third side of a second central axis, the second central axis orthogonal to the first central axis. A fourth permanent magnet is coupled to the mirror on a fourth side of the second central axis, the fourth side opposite the third side. A first electromagnet is attached to the base and configured to apply a force to the first permanent magnet to selectively push or pull the scanning fixture such that the mirror oscillates around the first central axis. A second electromagnet is attached to the base and configured to apply a force to the second permanent magnet to selectively push or pull the scanning fixture such that the mirror oscillates around the first central axis. A third electromagnet attached to the base and configured to apply a force to the third permanent magnet to selectively push or pull the scanning fixture such that the mirror oscillates around the second central axis. A fourth electromagnet is attached to the base and configured to apply a force to the fourth permanent magnet to selectively push or pull the scanning fixture such that the mirror oscillates around the second central axis. A first flexible sheet is elongated along a first plane between a first end and a second end of the first flexible sheet, the first end attached to the scanning fixture and the second end attached to the base. A second flexible sheet is elongated along a second plane between a third end and a fourth end of the first flexible sheet, the third end attached to the scanning fixture and the fourth end attached to the base.

In some embodiments, the first flexible sheet is attached to the scanning fixture on the first side of the first central axis and to the base on the second side of the first central axis such that the first flexible sheet flexes along the first plane when the scanning fixture oscillates around the first central axis. The second flexible sheet can be attached to the scanning fixture on the second side of the first central axis and to the base on the first side of the first central axis such that the second flexible sheet flexes along the second plane when the scanning fixture oscillates around the first central axis. In some embodiments, the first flexible sheet and the second flexible sheet are elongated in the direction of the second central axis such that the first flexible sheet and second flexible sheet flex in torsion when the scanning fixture oscillates around the second central axis. In some cases, the scanning assembly is configured to operate is a resonant mode. In the resonant mode, the mirror oscillates at a first oscillation frequency around the first central axis to change a first angle of the reflective surface between −15 degrees and 15 degrees, the first oscillation frequency being in the range of 10-20 Hz. Further, in resonant mode, the mirror oscillates at a second oscillation frequency around the second central axis to change a second angle of the reflective surface between −5 degrees and 5 degrees, the second oscillation frequency being in the range of 100-200 Hz.

In some embodiments, the scanning fixture is configured to oscillate the mirror at a first frequency around the first central axis and at a second frequency around the second central axis. The scanning assembly can further include a first accelerometer configured to measure oscillation of the mirror around the first central axis and a second accelerometer configured to measure oscillation of the mirror around the second central axis. In some embodiments, the scanning fixture is configured to hold the first permanent magnet and the second permanent magnet at an angle with respect to the mirror. Further, the surface of the first electromagnet is parallel to the first permanent magnet and the surface of the second electromagnet is parallel to the second permanent magnet. The first flexible sheet can include a first central cutout region and the second flexible sheet can include a second central cutout region aligned with the first central cutout region of the first flexible sheet. In some embodiments, the first central cutout region of the first flexible sheet has a planar width less than or equal to half a width of the first end of the first flexible sheet. Further, the second central cutout region of the second flexible sheet can have a planar width less than or equal to half a width of the third end of the second flexible sheet.

In at least one aspect, the subject technology relates to a scanning assembly for a detection system for a vehicle. The scanning assembly includes a base, a scanning fixture, and flexible sheets. The base is configured to attach the scanning assembly to the vehicle. The scanning fixture includes a mirror having a reflective surface, the mirror having a first central axis and a second central axis running orthogonal to the first central axis. A first flexible sheet is directly connected to the base and the scanning fixture. A second flexible sheet is directly connected to the base and the scanning fixture. Oscillation of the mirror around the first central axis causes the first flexible sheet to flex along a length of a plane formed by the first flexible sheet and the second flexible sheet to flex along a length of a plane formed by the second flexible sheet. Further, oscillation of the mirror around the second central axis causes the first flexible sheet and the second flexible sheet to flex in torsion.

In some embodiments, the first flexible sheet and the second flexible sheet, exclusively, form a mechanical path between the base and the scanning fixture. In some cases, the scanning assembly is configured to operate is a resonant mode. In resonant mode, the mirror oscillates at a first oscillation frequency around the first central axis to change a first angle of the reflective surface between −15 degrees and 15 degrees, the first oscillation frequency being in the range of 10-20 Hz. Further, in resonant mode, the mirror oscillates at a second oscillation frequency around the second central axis to change a second angle of the reflective surface between −5 degrees and 5 degrees.

BRIEF DESCRIPTION OF THE DRAWINGS

So that those having ordinary skill in the art to which the disclosed system pertains will more readily understand how to make and use the same, reference may be had to the following drawings.

FIGS. 6b-6c are perspective cross-sectional views of the pivot of FIG. 6a.

FIGS. 9a-9b are perspective views of another embodiment of a scanning assembly in accordance with the subject technology.

FIG. 10b is a left side perspective view of the scanning assembly of FIG. 10a.

FIG. 10c is a bottom perspective view of the scanning assembly of FIG. 10a.

FIG. 10d is a front view of the scanning assembly of FIG. 10a.

FIG. 10e is a left side view of the scanning assembly of FIG. 10a.

DETAILED DESCRIPTION

Figure 1:
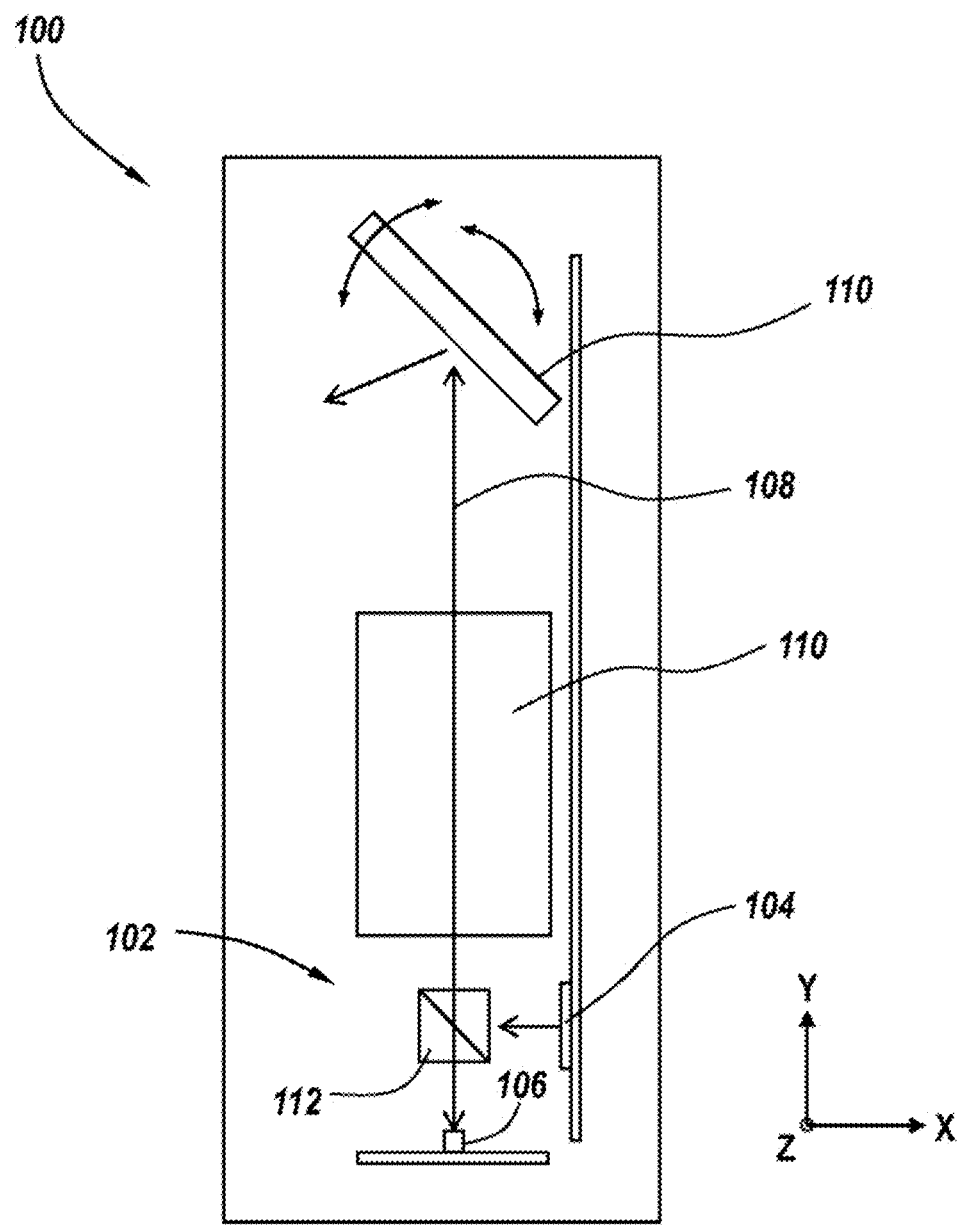
FIG. 1 is an overhead view of a detection system for a vehicle in accordance with the subject technology.

The subject technology overcomes many of the prior art problems associated with vehicle detection systems. In brief summary, the subject technology provides scanning assembly that is cost effective and allows the detection system to cover a large field of view with good resolution and reduced interference from external forces. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1, a detection system for a vehicle in accordance with the subject technology is shown generally at 100. The detection system 100 includes a LiDAR system 102 having light transmitters 104 and light receivers 106. The light transmitters 104 and light receivers 106 are arranged in vertical columns along the z axis in a single file column or an array. Each individual transmitter 104 can have a corresponding receiver 106 at a shared location along the z axis. As the light beams 108 are transmitted from the light transmitters 104, the light beams 108 pass through a lens 110. Notably, the terms "lens" or "lenses" are used throughout and it should be understood that each lens 110 may have several pieces of glass of differing shapes, thickness, and/or curvature. The term "lens" is not limited to a single piece of glass. In general, the lens 110 acts as a collimating lens to orient the transmitted (and returning) light beams 108. After passing through the lens 110, the transmitted light beams 108 deflect off the scanning assembly 110 and into a surrounding environment of the vehicle. The scanning assembly 110 includes at least one reflective member (or mirror) which is rotated in different directions to allow the detection system 100 to scan the environment in azimuth and elevation. The transmitters 104 and receivers 106 both face a beam splitter 112 which is arranged to direct the transmitted light beams 108 towards the scanning assembly 110 while allowing the returning light beams 108 to pass through for receipt by the receivers 106 after deflecting off objects in the environment. The beam splitter 112 can be one of the many types of known beam splitters, such as polarizing or non-polarizing. After deflecting off objects in the environment, the light beams 108 return to the detection system 100 for receipt by the light receivers 106. The detection system 100 then relies on the received light beams 108 to generate information on the whereabouts of objects within the environment, in accordance with other LiDAR based detection systems as are known in the art.

Figure 2A:
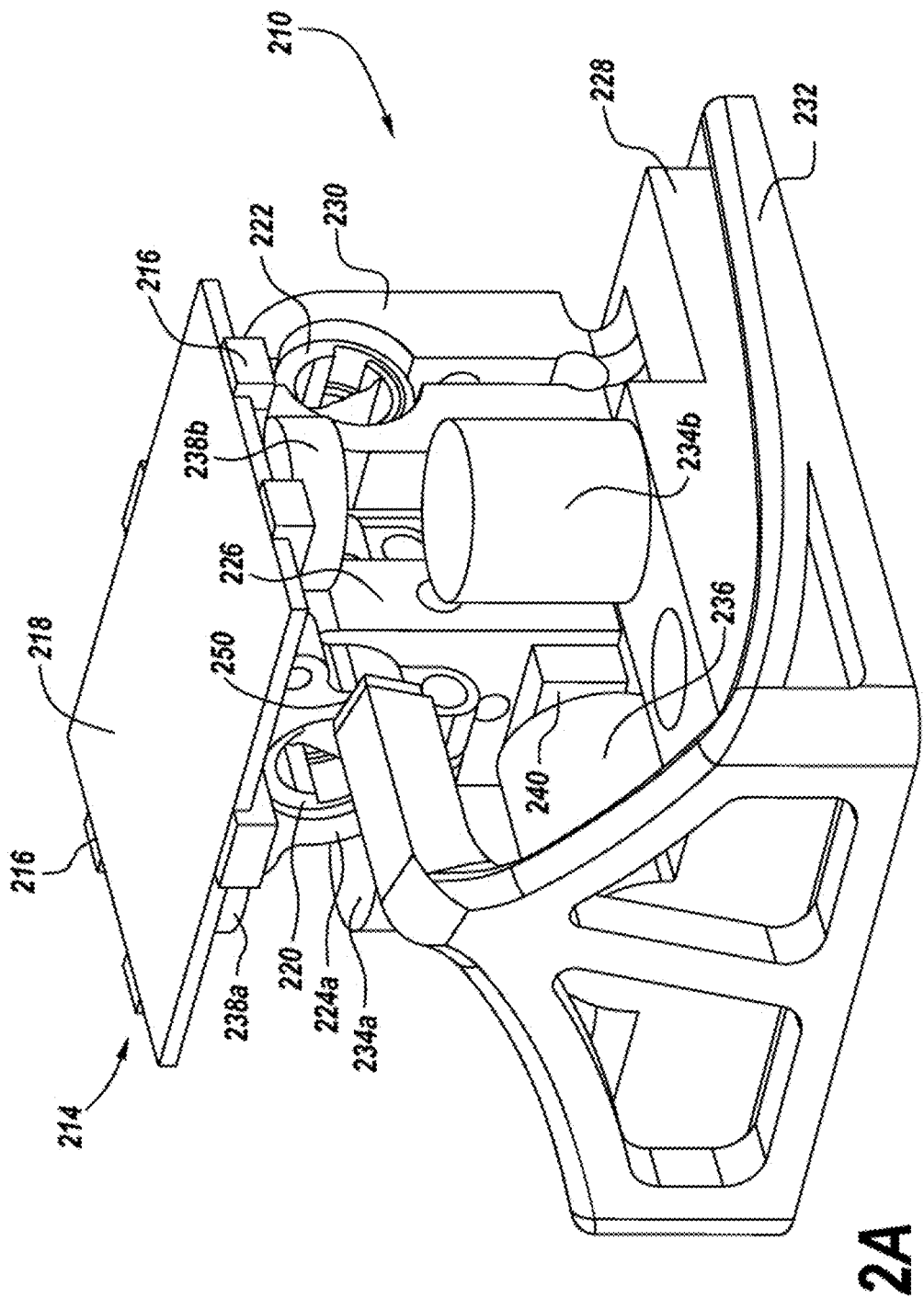
FIG. 2a is a perspective view of an embodiment of a scanning assembly for a detection system in accordance with the subject technology.
Figure 2B:
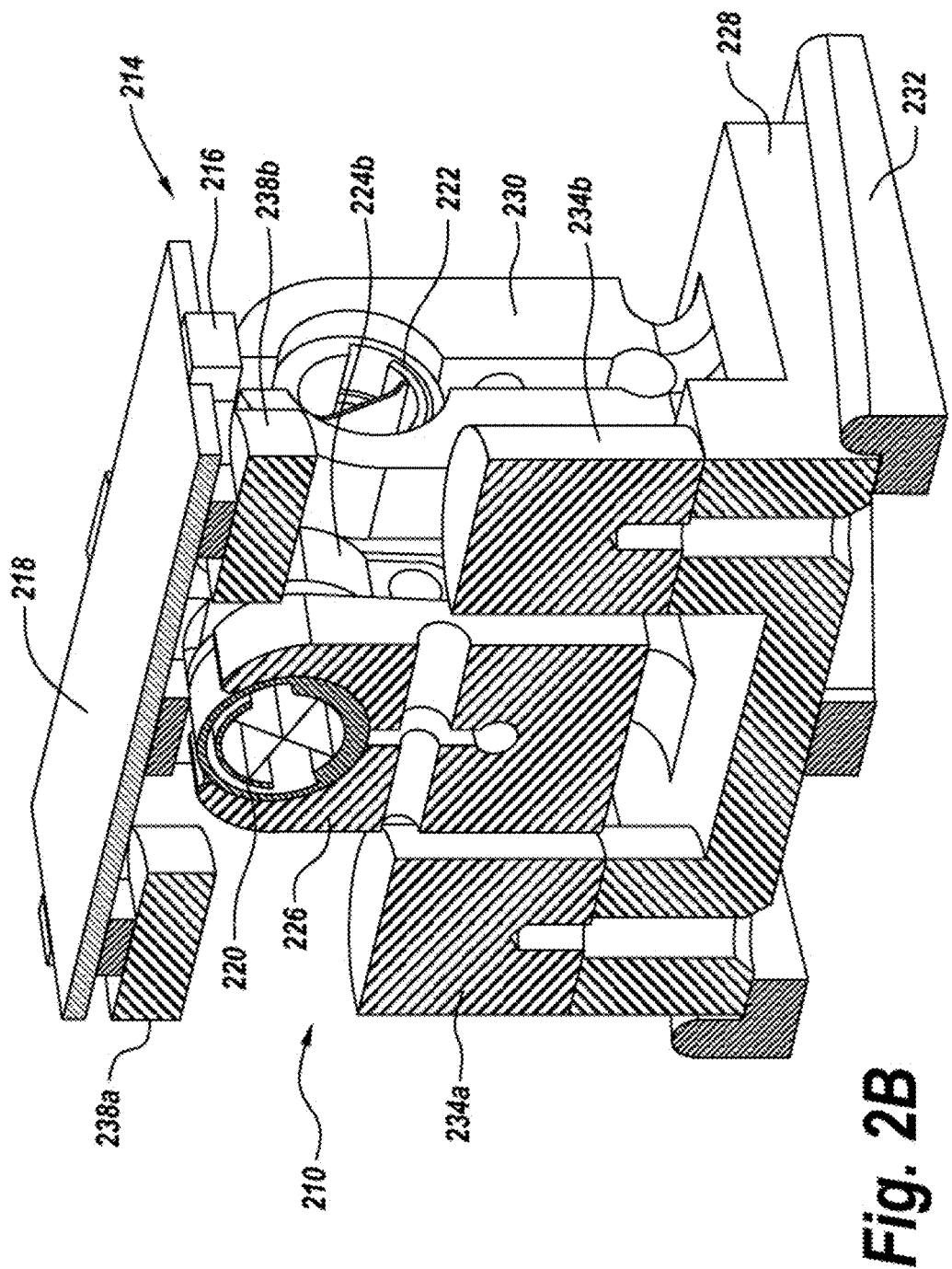
FIGS. 2b-2c are perspective cross-sectional views of the scanning assembly of FIG. 2.
Figure 2C:
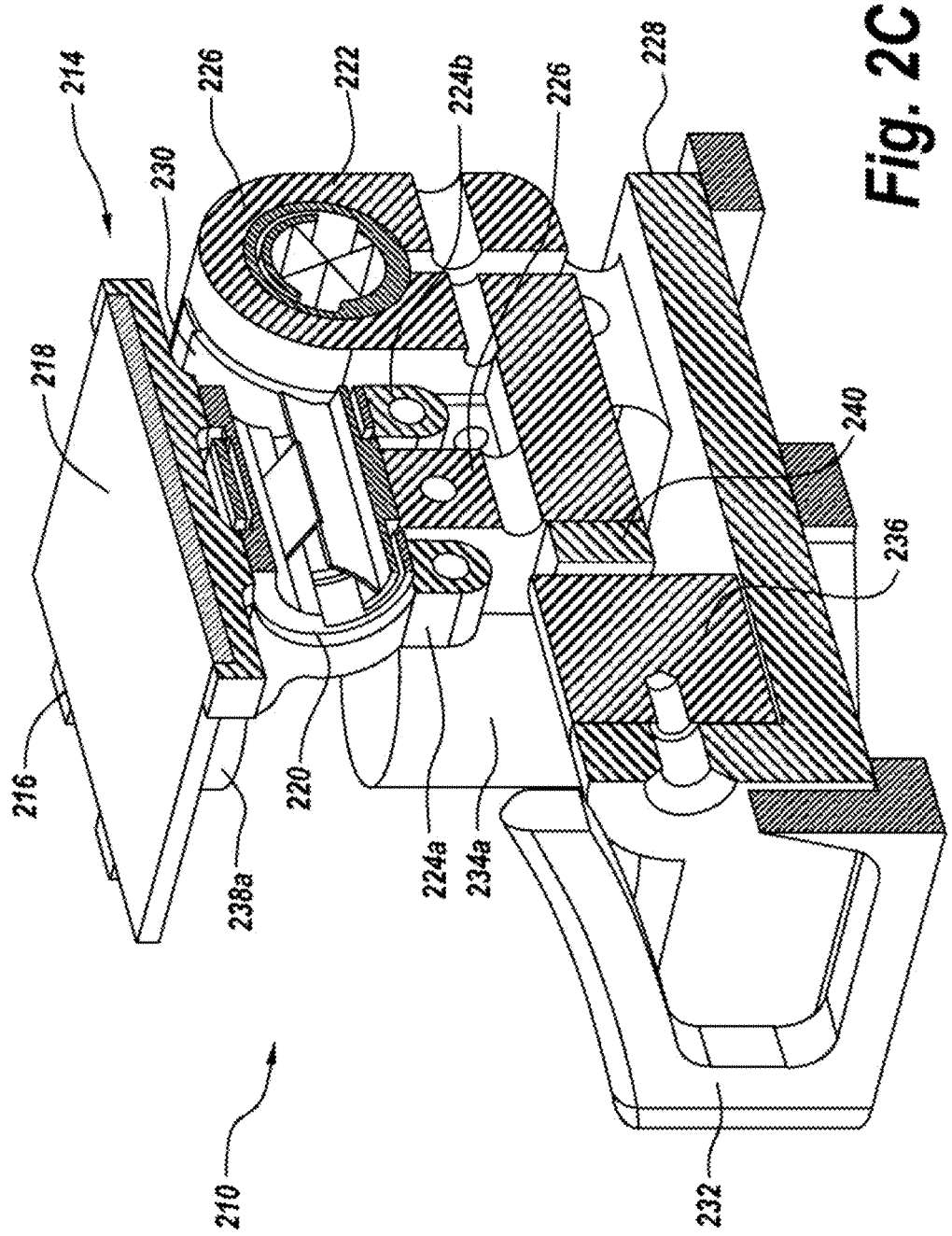

Referring now to FIGS. 2a-c, a scanning assembly 210 for a detection system 100 for a vehicle is shown. Notably, the scanning assembly 210 is suitable for inclusion in many detection systems as are known in the art, the detection system 100 only being provided by way of example.

The scanning assembly 210 includes a scanning fixture 214 with a frame 216 and a reflective mirror 218. The mirror 218 is made from a reflective material to deflect outgoing transmitted light beams 108 into the environment and deflect returning light beams 108 towards the receivers 106. In general, the scanning assembly 210 is configured to rotate the mirror 218 to scan in the azimuth and elevation directions, allowing the detection system 100 to canvass the environment and generate a field of view of the environment around the vehicle.

The scanning fixture 214 includes two fastener clamps 224a, 224b extending from the underside of the frame 216 which attach the scanning fixture 214 to the first pivot 220. A central member 226 connects to both the first pivot 220 and the second pivot 222, coupling the pivots 220, 222 together. The second pivot 222 is then connected to the base 228 by base clamps 230. The base 228 is configured to attach the scanning assembly 210 to a vehicle. For example, the base 228 can include a frame 232 which can be fixed to a vehicle via screws. In the example shown, the fastener clamps 224a, 224b connect to outer cylinders of the first pivot 220 and the base clamps 230 connect to outer cylinders of the second pivot 222. The central member 226 runs between the central cylinders of the first and second pivot 220, 222 (the pivots 220, 222 and pivot cylinders are shown and described in more detail with respect to FIGS. 6a-6c below). In this way, the scanning mirror 218 is coupled to the base 228 exclusively through attachment of the first pivot 220 to the second pivot 222 via the central member 226, the second pivot 222 in turn being attached to the base 228. Therefore the mechanical path between the mirror 218 and the vehicle necessarily passes through both pivots 220, 222. This results in bumps, vibration, or other potential sources of interference from the vehicle being reduced before they reach the scanning assembly 210. In particular, the configuration of the pivots 220, 222, discussed in more detail below, absorbs such interference which ultimately allows the detection system to derive a more accurate representation of the environment. The design of the scanning assembly 210 is also compact, as compared to the size of the mirror 218 and the moment of inertia of the mirror 218 is kept low for azimuth and elevation rotation.

Scanning in the elevation direction is made possible by rotation of the mirror 218 around the first pivot 220 while scanning in the azimuth direction is made possible by rotation around the second pivot 222. The first pivot 220 is elongated along a first axis for rotation around the first axis. Rotation of the first pivot 220 around the first axis turns the mirror 218 to change the field of view of the detection system in a first direction. The first direction can be the azimuth direction. The second pivot 222 is elongated along a second axis orthogonal to the first axis for rotation around the second axis. Once the base 228 is fixed to the vehicle, the base 228 holds the second pivot 222 such that it remains elongated along the second axis with respect to the vehicle. Rotation of the second pivot 222 around the second axis turns the mirror 218 to change the field of view of the detection system in a second direction. The second direction can be the elevation direction. In this way, rotation of the pivots 220, 222 causes a rotation of the mirror around the pivots 220, 222 (i.e. around the pivot axes) to create the field of view for the detection system. Rotation of the mirror 218 around the pivots 220, 222 is effectuated by the interaction between electromagnets 234a, 234b, 236 and corresponding permanent magnets 238a, 238b, 240, as discussed in more detail below.

Feedback devices can also be included within the scanning assembly 210 such that adjustments can be made to optimize the scanning assembly 210. For example, an optical encoder 250 can be included to measure the actual scanning frequency of the scanning assembly 210, as discussed in more detail below. Feedback devices can also be included to provide feedback on voltage supplied to the electromagnets 234a, 234b, 236. The actual scanning frequency can then be compared to the input voltage to the electromagnets 234a, 234b, 236. Adjustments can then be made so that the correct voltage is being input into the electromagnets 234a, 234b, 236 to obtain the desired scan frequency. Other feedback devices can make further adjustments as needed to account for other factors, such as acceleration of the mirror 218 or temperature felt by the scanning assembly 210.

Figure 3A:
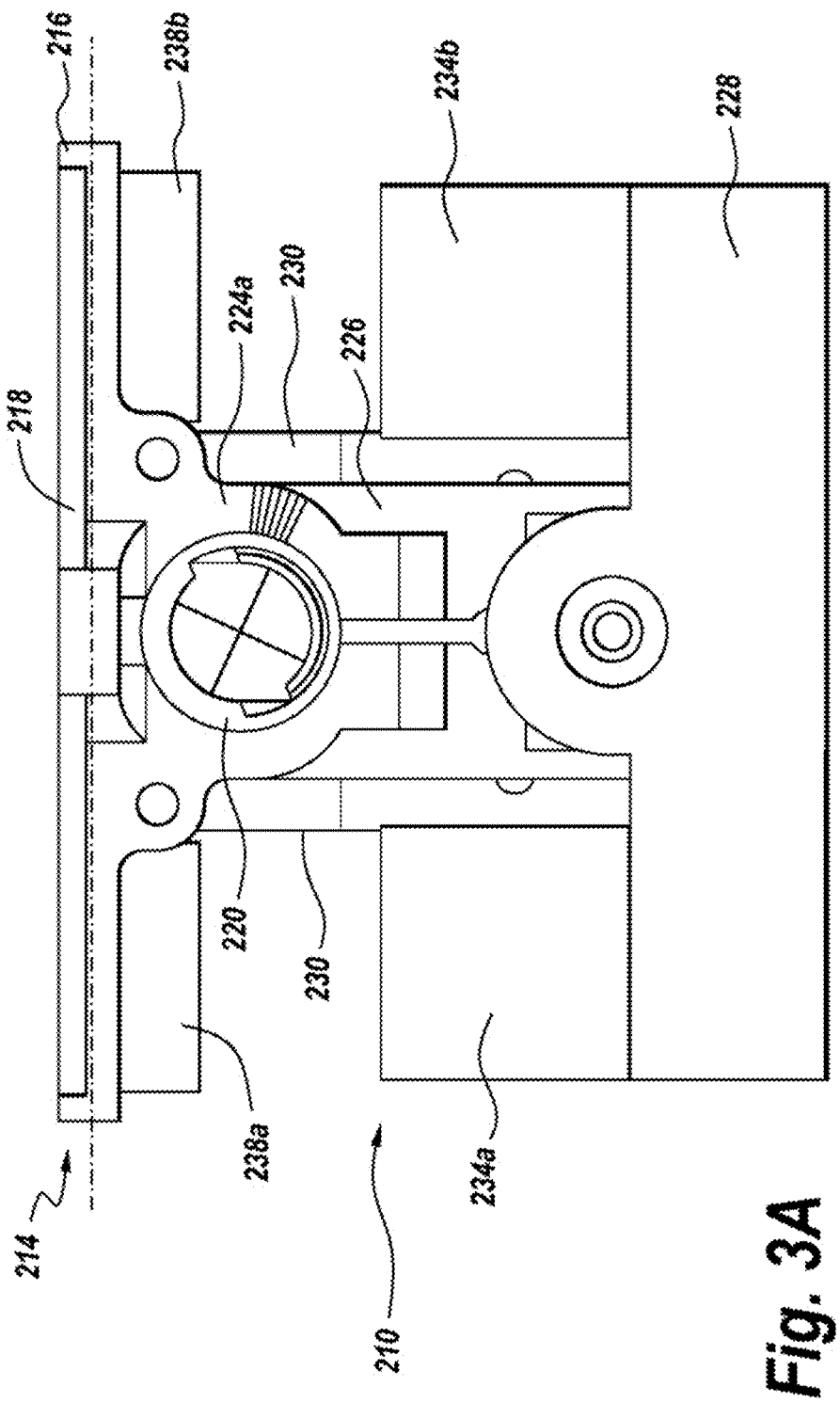
FIG. 3a is a front view of a scanning assembly for a vehicle in accordance with the subject technology in the neutral position.
Figure 3B:
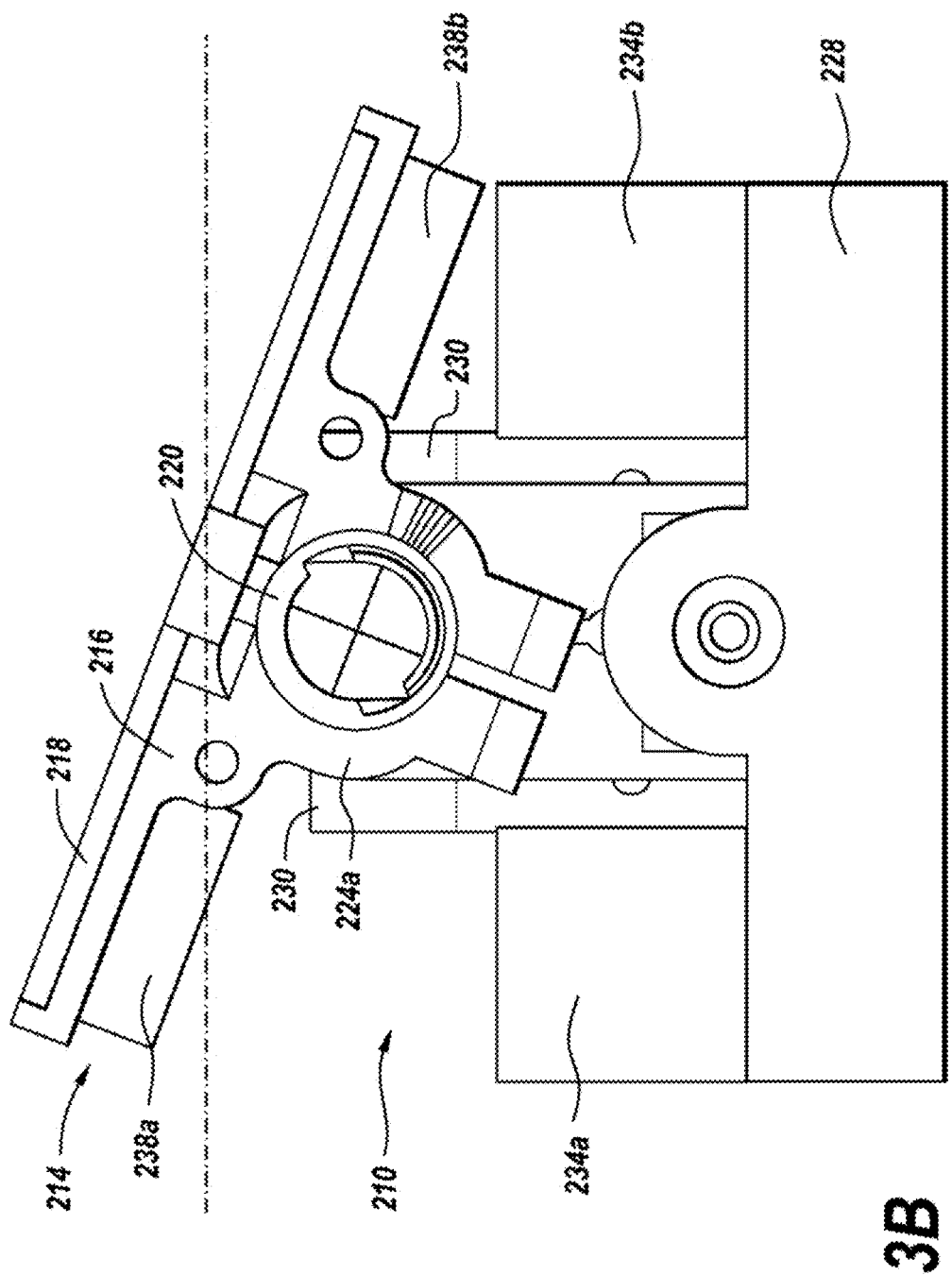
FIG. 3b is a front view the scanning assembly of FIG. 3a tilted for azimuth scanning.
Figure 3C:
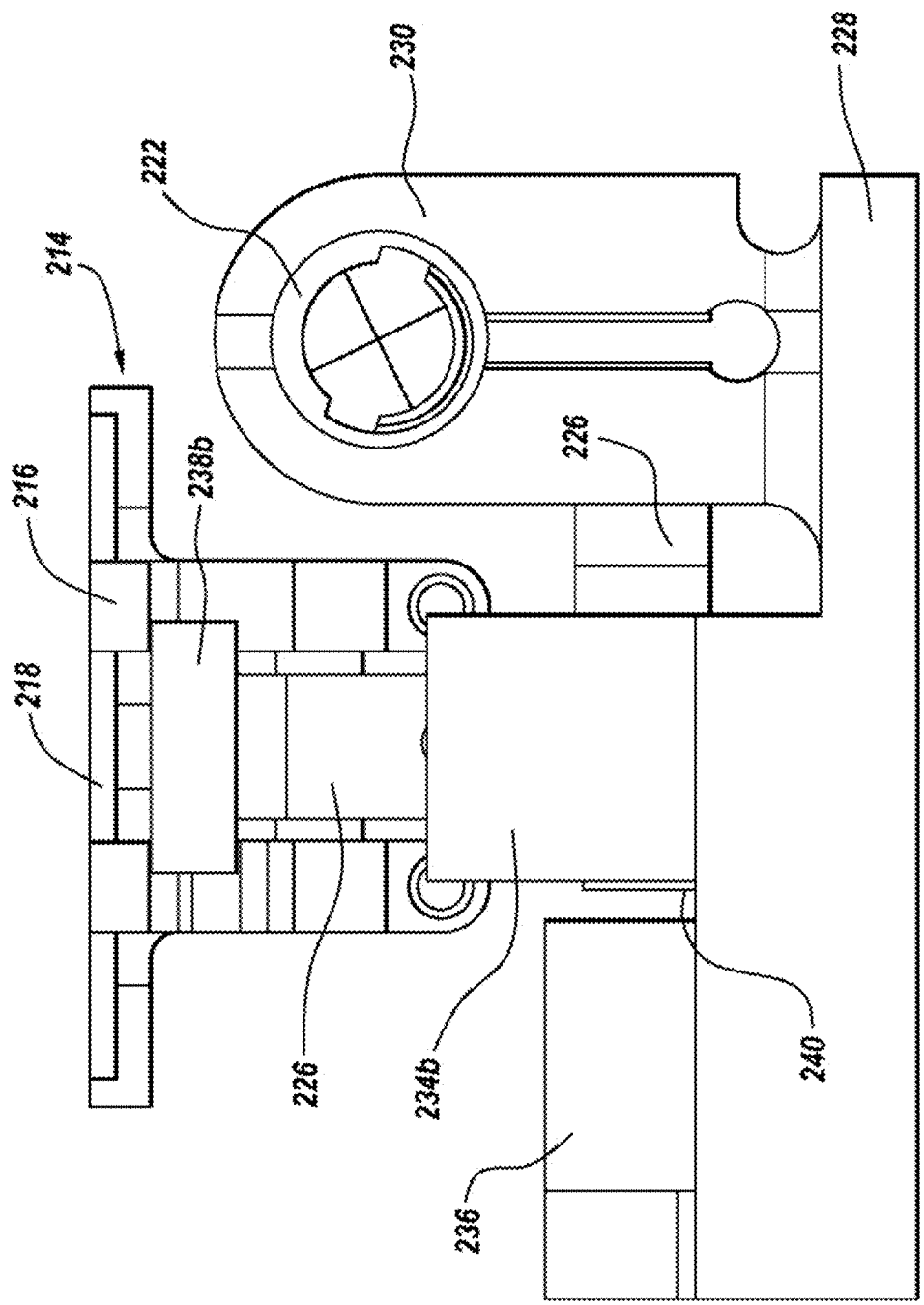
FIG. 3c is a side view the scanning assembly of FIG. 3a in the neutral position.
Figure 3D:
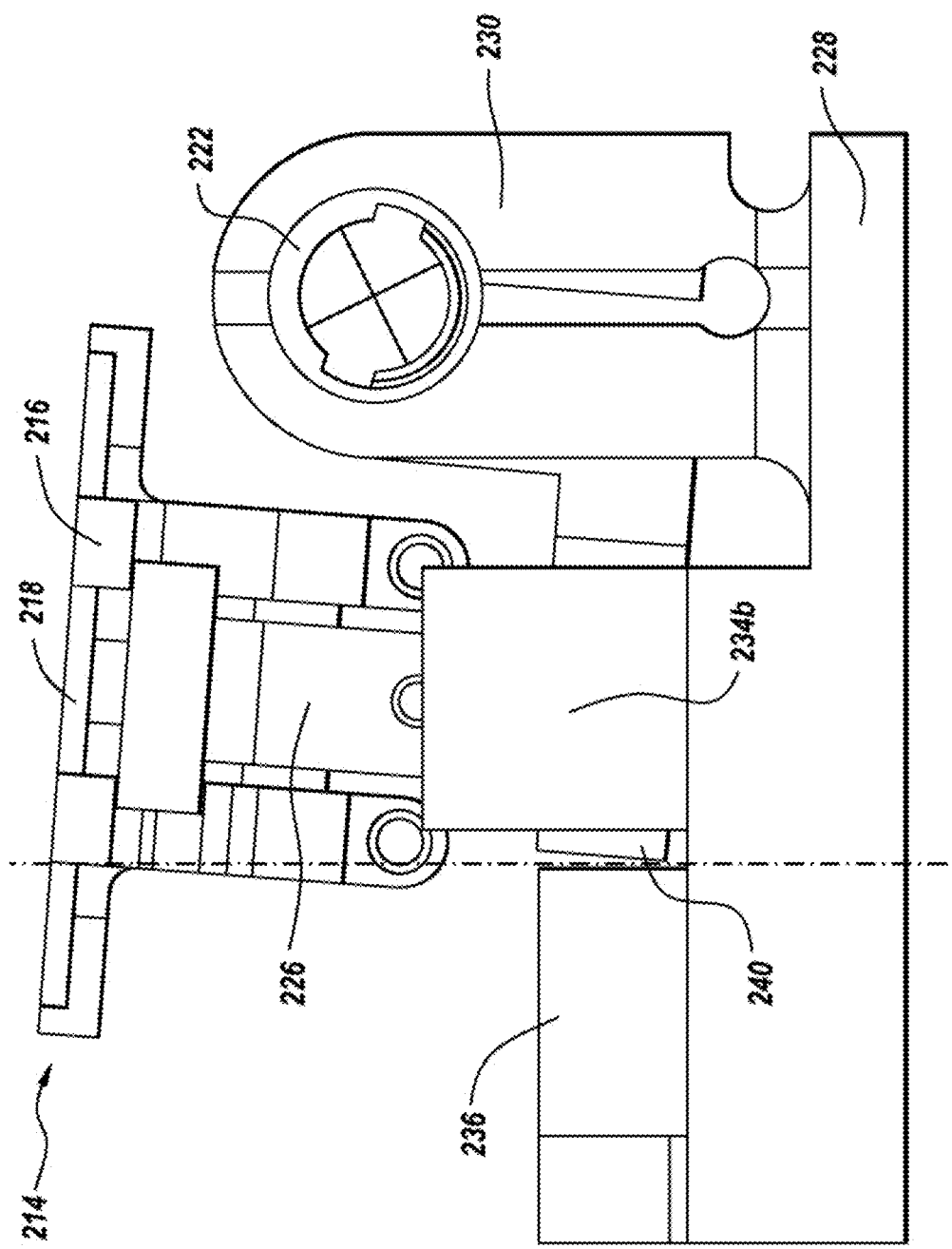
FIG. 3d is a front view the scanning assembly of FIG. 3a tilted for elevation scanning.

Referring now to FIGS. 3a-3d, various orientations of the scanning mirror are shown as the scanning mirror canvasses the environment. In particular, FIGS. 3a and 3c show the scanning assembly 210 in a neutral orientation, FIG. 3b shows the scanning assembly 210 rotated to scan in the azimuth direction, and FIG. 3d shows the scanning assembly 210 rotated to scan in the elevation direction.

Referring now to FIGS. 3a-3b, to facilitate rotation around the first pivot 220, permanent magnets 238a, 238b are fixed on first and second sides of the underside of the scanning fixture 214. Corresponding electromagnets 234a, 234b are attached to the base 228 adjacent to the permanent magnets 238a, 238b to effect the permanent magnets 238a, 238b with a magnetic field. Each electromagnet 234a, 234b generates a magnetic field in response to an applied voltage or current (from a source within the detection system not distinctly shown) that interacts with a corresponding permanent magnet 238a, 238b, applying a force to selectively push or pull the permanent magnet 238a, 238b as desired. The electromagnets 234a, 234b apply force in an opposite direction to cause the mirror 218 to rotate around the first pivot 220. For example, when one electromagnet 234a pushes its corresponding permanent magnet 238a away, the other electromagnet 234b pulls its corresponding permanent magnet 238b closer. As the mirror 218 tilts to one side, the distance between one electromagnet 234a and permanent magnet 238a pair grows while the distance between the other electromagnet 234b and permanent magnet 238b shrinks. As the tilt of the mirror 218 approaches the maximum desired level (e.g. FIG. 3b, the pairing with the smaller distance in between will begin to exert significantly more force. Once the maximum desired degree of tilt is reached, the magnetic fields of the electromagnets 234a, 234b are reversed, causing the electromagnet 234a that was previously pushing the corresponding permanent magnet 238a to pull the corresponding permanent magnet 238a and vice versa for the other electromagnet 234b and permanent magnet 238b pairing. In this way, the electromagnets 234a cause oscillation of the mirror 218 around the first axis (i.e. through pivot 220). Thus, as the light beams strike the mirror 218, the field of view of the detection system changes in the azimuth direction.

Referring now to FIGS. 3c-3d, another electromagnet 236 and permanent magnet 240 pair is arranged to rotate the mirror 218 for scanning in the elevation direction. The permanent magnet 240 used for elevation rotation is fixed to the central member 226 while the corresponding electromagnet 236 is fixed to the base 228, oriented orthogonal to the other electromagnets 234a, 234b. Since there is only one elevation electromagnet 236, it is the push or pull of the single elevation electromagnet 236 which causes rotation of the mirror 218 for scanning in the elevation direction. More specifically the force from the electromagnet 236 on the permanent magnet 240 causes the central member 226 to move towards or away from the electromagnet 236, causing rotation around the second pivot 222. As such, voltage or current can be selectively applied to the electromagnet 236 to cause the mirror 218 to oscillate around the second axis, redirecting light beams from the LiDAR system to change the field of view of the detection system in the elevation direction. The configuration of the scanning assembly 210 allows the detection system to scan in both azimuth and elevation without expending a significant amount of power. The scanning assembly 210 typically takes less than 1 Watt to operate, as opposed to roughly 10 Watts as is common in other known scanning assemblies.

Figure 4:
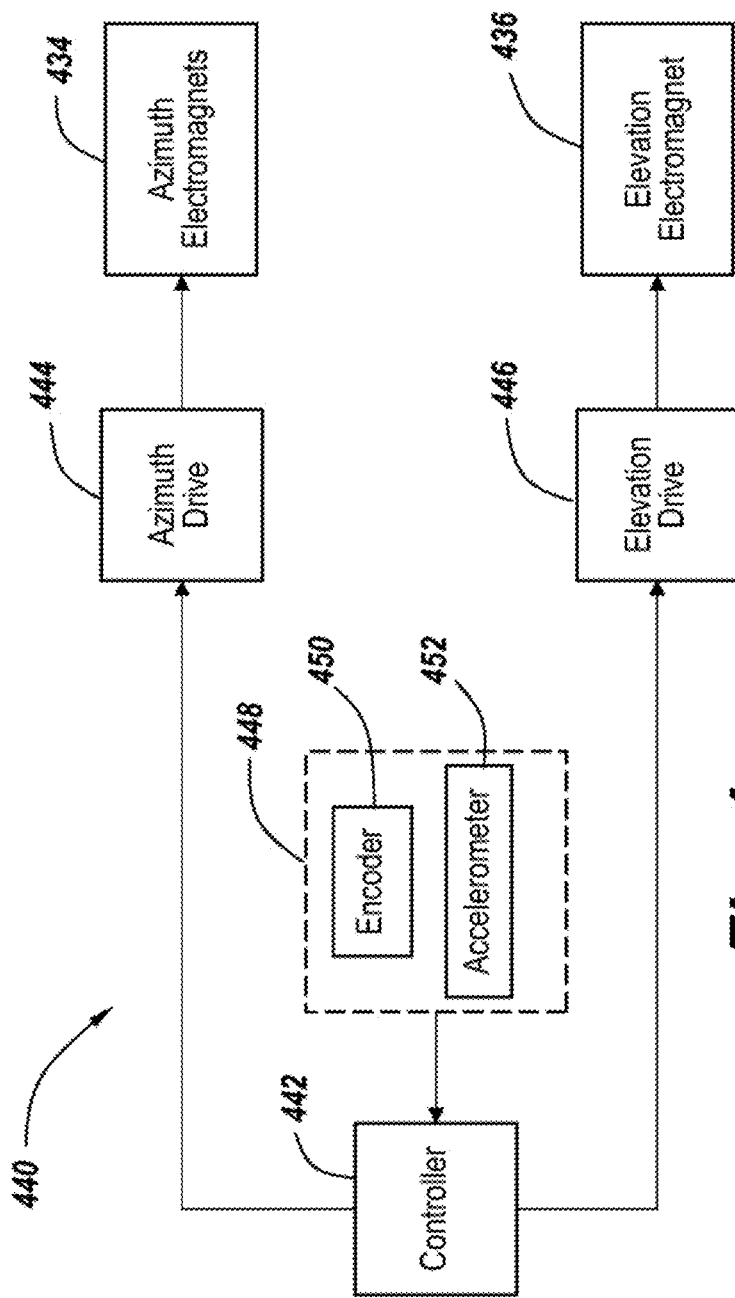
FIG. 4 is a block diagram showing the controls for a scanning assembly in accordance with the subject technology.

Referring now to FIG. 4, a simple block diagram of a control system 440 for the scanning assembly 210 in accordance with the subject technology is shown. The main scanning assembly 210 is run by a controller 442 which can be a computer such as an ASIC, microprocessor, FPGA, or other processor with memory programmed to perform the desired functions. Movement of the mirror about the azimuth and elevation axes is controlled by the application of the magnetic fields. More specifically, main controller 442 controls the oscillation of the mirror depending on the desired scan speed and mirror tilt. This is done by providing a signal to the azimuth drive 444 and elevation drive 446 indicative of either the desired scan speed and mirror tilt, or of the specific voltage amount to be applied to obtain the desired voltage amount. The desired voltage amount is then applied, by the azimuth drive 444, to the azimuth electromagnets 434 for scanning in the azimuth direction. Likewise the desired voltage for elevation scanning is provided, by the elevation drive 446, to the elevation electromagnets 436. As discussed herein, the each electromagnet 434, 436 corresponds with a permanent magnet. Therefore by controlling magnetic field strength via applied voltage to the electromagnets 434, 436, force between the electromagnets 434, 436 and permanent magnets can be controlled. Direction of the force changes with the direction of the current flow. Likewise, direction of the mirror rotation changes with the change in the direction of the force. The mirror is therefore made to oscillate by applying a push-pull force.

Various methods can be employed for controlling azimuth and elevation scanning as described above. One method of controlling force between the electromagnets 434, 436 and permanent magnets is to use the electromagnet's series resistance in conjunction with varying the voltage applied across two terminals of the electromagnets 434, 436. Decreasing the voltage will decrease the field force; likewise increasing the voltage will increase the field force. The voltage applied to the electromagnet dynamically controls the angular speed of the rotation as well as the maximum deflection angle of the mirror. This dynamic control of the voltage allows for fine control of the scanning angles of the mirror.

The electromagnets 434, 436 can be driven with a square waveform to create the push-pull force between the electromagnets 434, 436 and the permanent magnets. The scanning mirror also experiences some opposing force from the frictionless pivots. Therefore the combination of the push-pull force between the magnets, and the opposing force from the frictionless pivots, can be combined to create a sinusoidal back and forth rotational movement (or oscillation) for azimuth and elevation scanning. In some cases, both elevation and azimuth oscillation is at or near the respective axial resonant frequency, as discussed in more detail below.

The scanning assembly 210 can also include a number of feedback devices 448. In the example shown, these include an encoder 450 and an accelerometer 452. The encoder 450 can be an optical encoder pointed at an encoder disk that is mounted on the azimuth scanning axis. The encoder 450 has an active infrared emitter directed at an encoder pattern on the encoder disk. The pattern of light is reflected back to a detector on the encoder 450. Signal processing electronics on the encoder 450 then output a corresponding signal back to the controller 442 so that positional information can be provided to scanning assembly 210. Feedback from the feedback devices 448 can be relied on by the controller 442 to make adjustments to the scanning assembly 210 as needed.

Referring now to FIGS. 5a-5e, scan patterns in accordance with the subject technology are shown. The graphs are representative of the area of the environment canvassed by the detection system as the scanning assembly oscillates in both the azimuth and elevation direction simultaneously. The mode used to generate the scan patterns is described herein as "resonant mode" and is one of the preferred modes of operation for the scanning assembly. In resonant mode, the mirror oscillates in the azimuth direction at a first oscillation frequency while also oscillating in the elevation direction at a second oscillation frequency.

In some ideal embodiments, the relative oscillation frequencies are set to produce a Lissajous pattern. A Lissajous pattern is sometimes obtained by having a ratio of first oscillation frequency to second oscillation frequency that is substantially between 0.10 and 0.15 ("substantially" meaning+/−10%). For example, the first oscillation frequency (azimuth frequency) can be substantially 30 Hz while the second oscillation frequency (elevation frequency) can be substantially 200 Hz. In another example, the first oscillation frequency can be substantially 20 Hz while the second oscillation frequency can be substantially 190 Hz. These frequencies have been found to produce a Lissajou pattern during resonant mode. While these examples have been found to be effective, other combinations of azimuth and elevation oscillation frequencies can also be used to produce a Lissajou pattern.

Figure 5A:
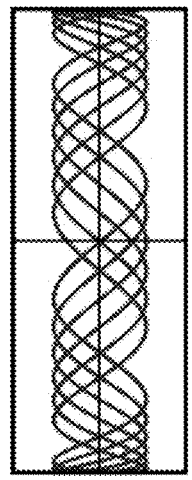
FIGS. 5a-5e are graphs depicting the area of an environment scanned in azimuth and elevation by a scanning assembly in accordance with the subject technology.

The scan patterns represented depicted in FIGS. 5a-5e are generated from a system in resonant mode which is calibrated to oscillation frequencies to generate a Lissajou pattern. In particular, FIG. 5a represents a single pass of the system, having gone through one full oscillation cycle. A full oscillation cycle means that for both azimuth and elevation directions, the mirror has started from an initial position, experienced the maximum desired rotation to canvass the entire pertinent field of view and then returned to the initial position. For example, the mirror may have been tilted for azimuth scanning from the neutral position (e.g. FIG. 3a) all the way towards a first side (e.g. FIG. 3b), all the way to the opposite side, and then returned to the neutral position to complete one full oscillation. The mirror also tilts in the elevation direction to complete a similar cycle.

Figure 5B:
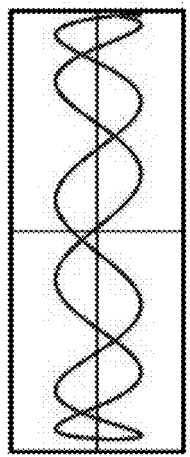
Figure 5C:
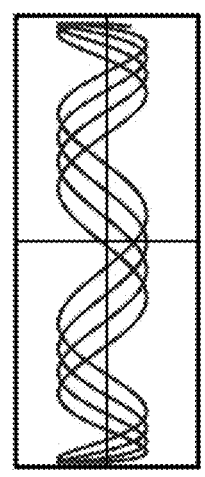
Figure 5D:
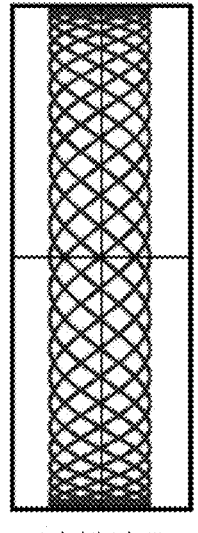
Figure 5E:
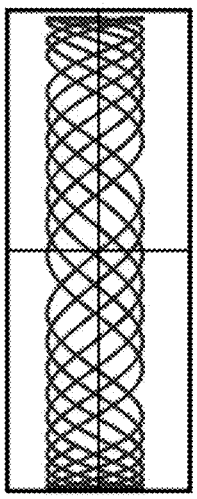

FIG. 5b shows the area of the environment canvassed after a second pass by the system (i.e. a second full oscillation cycle). Likewise, FIG. 5c shows the area of the environment canvassed after a third pass, FIG. 5d being after a fourth pass, and FIG. 5e being after a fifth pass. As more passes are made with the Lissajou pattern generated by the assembly means that the gaps in the field of vision of the system are filled in.

Figure 6A:
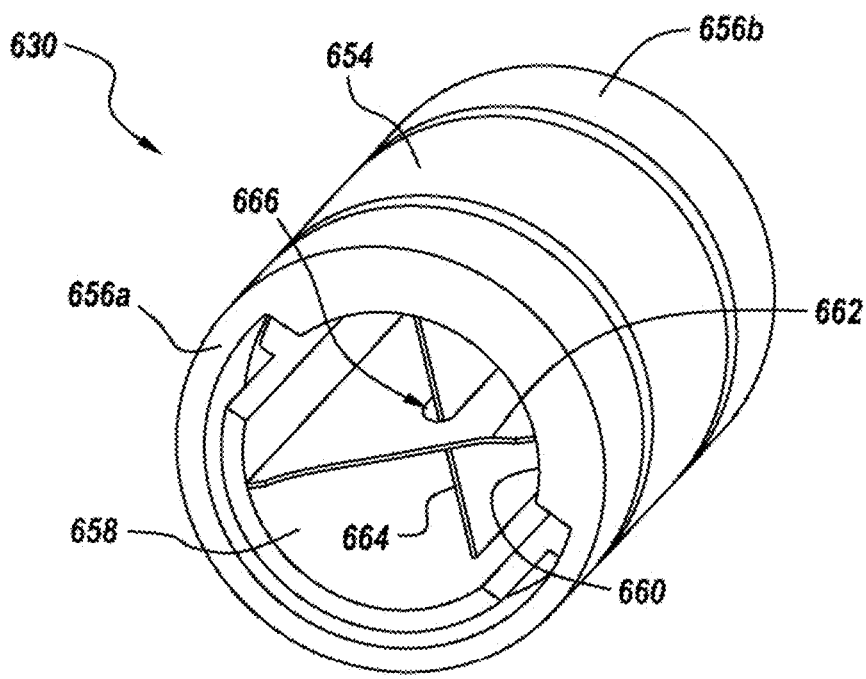
FIG. 6a is a perspective view of a pivot for a scanning assembly in accordance with the subject technology.
Figure 6B:
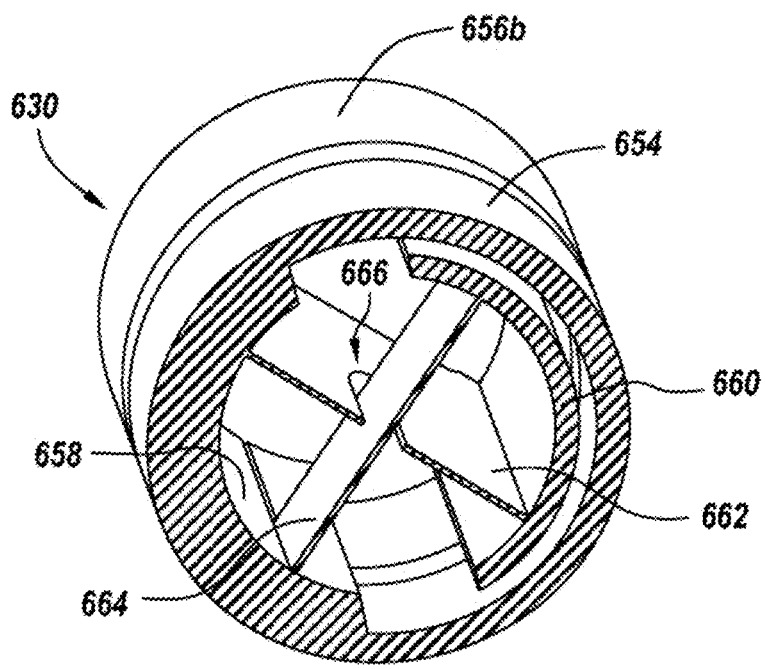
Figure 6C:
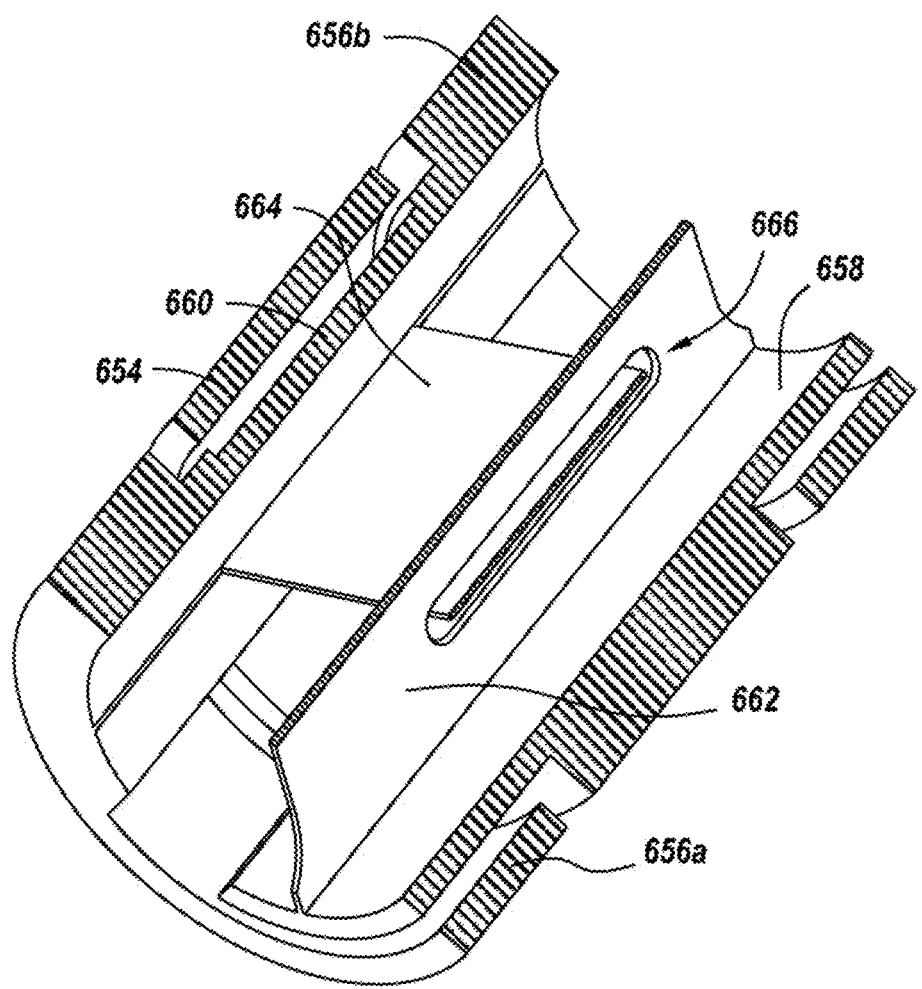

Referring now to FIGS. 6a-6c, a pivot 630 in accordance with the subject technology is shown. The pivot 630 can be used within the assembly as shown with respect to the other pivots herein. For example, the pivots 220, 222 can be configured and arranged similarly to the pivot 630. FIG. 6b is a vertical cross-sectional view of the pivot 630 sliced through the central cylinder 654. FIG. 6c is a horizontal cross-sectional view of the pivot 630, sliced orthogonally to the vertical cross-sectional view of FIG. 6b.

The pivot 630 includes a central cylinder 654 disposed in between first and second cylinder ends 656a, 656b (generally 656). A central arcuate member 658 is immovably fixed to the central cylinder 654, while an end arcuate member 660 is immovably fixed between the first and second cylinder ends 656 (as perhaps best seen in FIG. 6c). The term "arcuate member" herein is simply used to describe a partial cylinder portion which forms a part of one or more of the full outer cylinders 654, 656. First and second flexible sheets 662, 664 provide the exclusive connection between the central cylinder 654 and the cylinder ends 656. More specifically, the first flexible sheet 662 extends along a first axis and connects the end arcuate member 660 to the central arcuate member 658, thereby connecting the cylinder ends 656 to the central cylinder 654. Along the plane formed by the sheet 662, the sheet 662 has its greatest thickness. Therefore the first sheet 662 resists movement between the central cylinder 654 and first and second cylinder ends 656 along its plane. On the other hand, the first sheet 662 is thin orthogonal to its plane. So when the pivot rotates, the resistance from the flexible sheet 662 comes from the thin portion in the rotational direction. Further, the flexible sheet 662 is made from flexible material that can bend without breaking or deforming, allowing it to bend in torsion. Rotation of the pivot 630 occurs when one section of the pivot 630 (i.e. the central cylinder 654) rotates around the first axis with respect to the other section (i.e. the attached cylinder ends 656) or vice versa, causing the sheet 662 to flex.

A second flexible sheet 664 similarly attaches to the central arcuate member 658 to the end arcuate member 660. The second flexible sheet 664 also elongated along a first axis to bend in torsion to allow rotation of the pivot 630. However, the second flexible sheet 664 substantially forms a plane which is orthogonal to the plane formed by the first flexible sheet 662. The second flexible sheet 664 includes a hollow central portion 666 which allows the first flexible sheet 662 to pass therethrough. Similar to the first flexible sheet 662, the second flexible sheet 664 resists movement along its plane. Overall, the pivot 630 is configured to allow for rotation of the pivot 630 through the torsional flexing of the flexible sheets 662, 664 while resisting separation or compression of the pivot 630. This is accomplished through the configuration of flexible sheets 662, 664 and the arcuate members 658, 660, as described herein. This configuration is completely frictionless during rotation of the scanning assembly.

The nature of the configuration of the flexible sheets 662, 664, as described above, is that force transferred through the pivot 630 must pass through the flexible sheets 662, 664 in order to pass through the pivots 630. Therefore, vibration and undesired force from the vehicle does not pass directly into the mirror. For example, in some cases, as shown in FIG. 2a, the mirror 218 is connected to the base 228 (the base 228 being connected to the vehicle) exclusively through connections through the pivots (i.e. pivots 220, 222). As a result some undesired force from the vehicle will be absorbed by the flexible sheets of the pivots 220, 222. Further, during oscillation cycles, rotation of the pivot (e.g. pivot 630) applies a torsional force to the sheets 662, 664, the sheets 662, 664 then providing a return torsional force to urge the pivot 630 back to a neutral position for a more effective oscillation cycle for azimuth and elevation scanning. Specifically, as the pivots 630 are deflected further away from the neutral position, they resist displacement off of the neutral position caused from the force between the electromagnets and permanent magnets, instead forcing the pivot 630 (and therefore the scanning mirror) back towards the neutral position with greater force. That is to say, the torsional force applied by the flexible sheets 662, 664 increases with angular displacement of the pivot 630. Therefore, as the scanning assembly approaches maximum deflection, the pivots 630 apply a greater resistive force and prepares the system for a change in direction as the scanning mirror oscillates. In some cases, the pivots 630 are configured to allow a maximum deflection of substantially 8 degrees.

Figure 7:
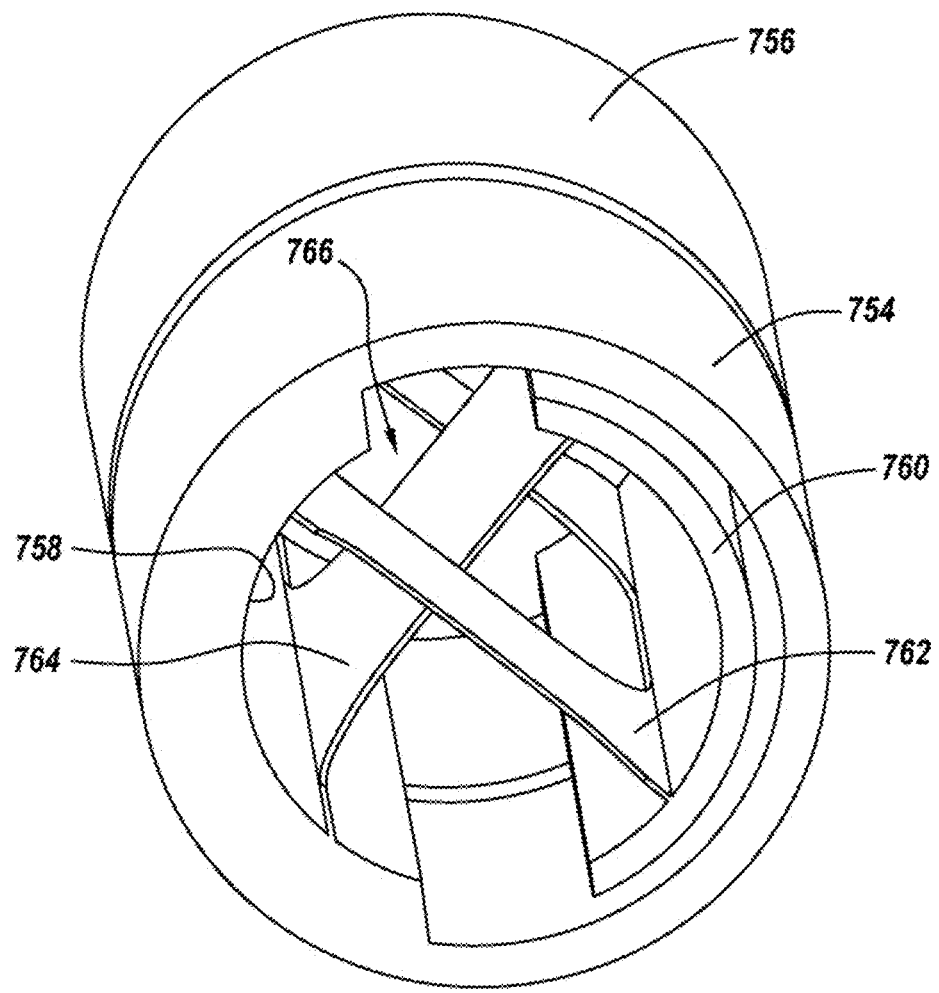
FIG. 7 is a perspective view of another embodiment of a pivot for a scanning assembly in accordance with the subject technology.

Turning now to FIG. 7, another embodiment of a pivot 730 in accordance with the subject technology is shown. Rather than the three cylinder pivot 630 shown in FIGS. 6a-6c, the pivot 730 is divided into a first and second section which each includes a single cylinder 754, 756. Except as otherwise described herein, the pivot 730 functions similarly to the pivot 630 and can be incorporated within any of the scanning assemblies and/or detection systems shown herein.

The cylinders 754, 756 of the two section pivot 730 are attached via flexible sheets 762, 764. To that end, the first cylinder 754 includes an immovably attached first arcuate member 758 which extends into the second cylinder 756 along a first axis around which the cylinders 754, 756 are elongated. Similarly, a second arcuate member 760 is immovably fixed to the second cylinder 756 and extends along the first axis into the first cylinder 754. The first and second sheets 762, 764 connect the first and second cylinders 754, 756 via connection to the first arcuate member 758 and the second arcuate member 760. The sheets 762, 764 can once again run at an angle to each other, or orthogonal to one another, to provide resistance to lateral separation. As shown, the first sheet 762 includes a gap allowing the second sheet 764 to run through the first sheet 762 so both can connect to the arcuate members 758, 760. As with the pivot 630, the flexible sheets 762, 764 then allow for frictionless rotation of the pivot 730 while providing a torsional resistance that forces the pivot 730 back towards a neutral position.

Figure 8A:
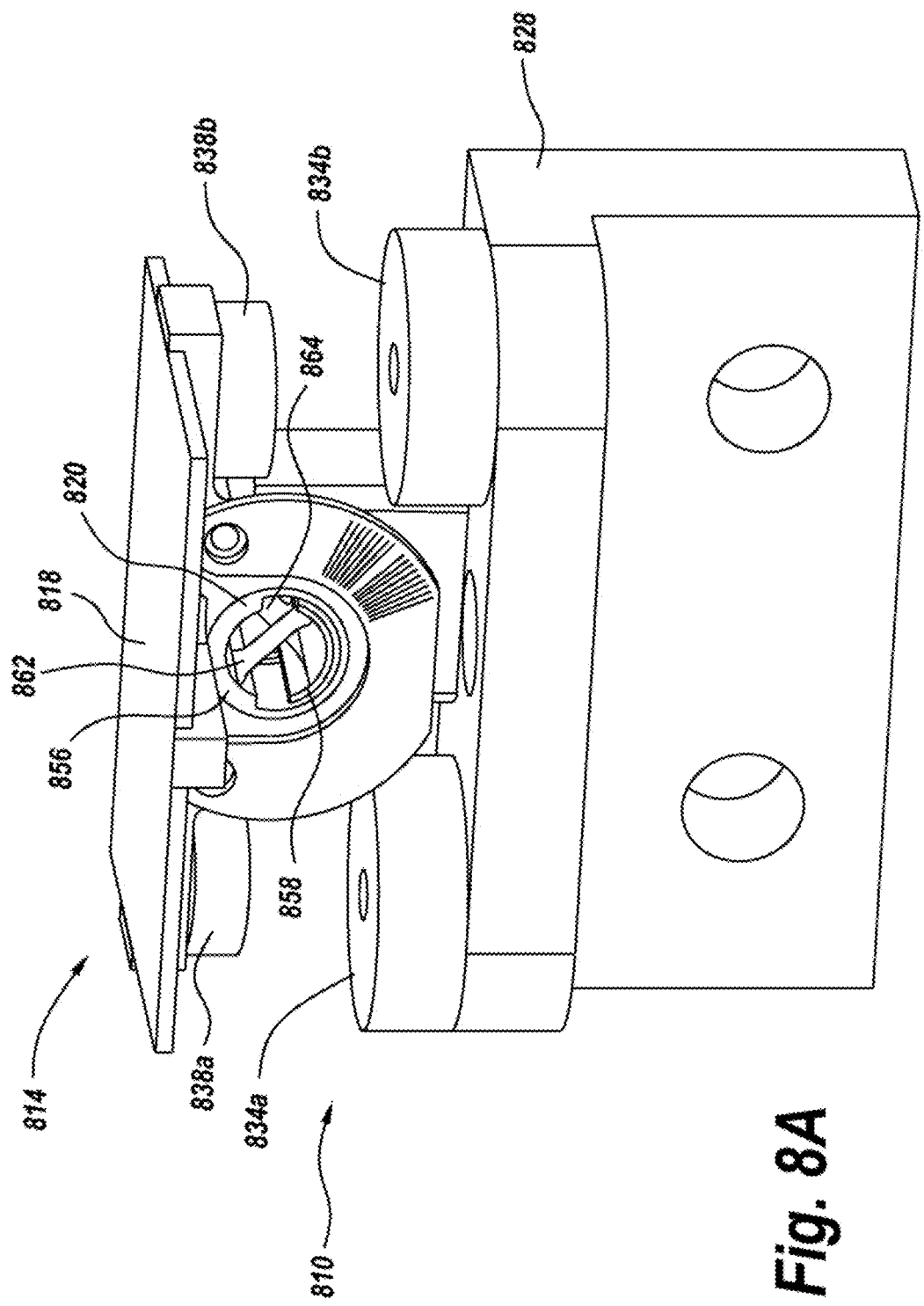
FIGS. 8a-8b are perspective views of another embodiment of a scanning assembly in accordance with the subject technology.
Figure 8B:
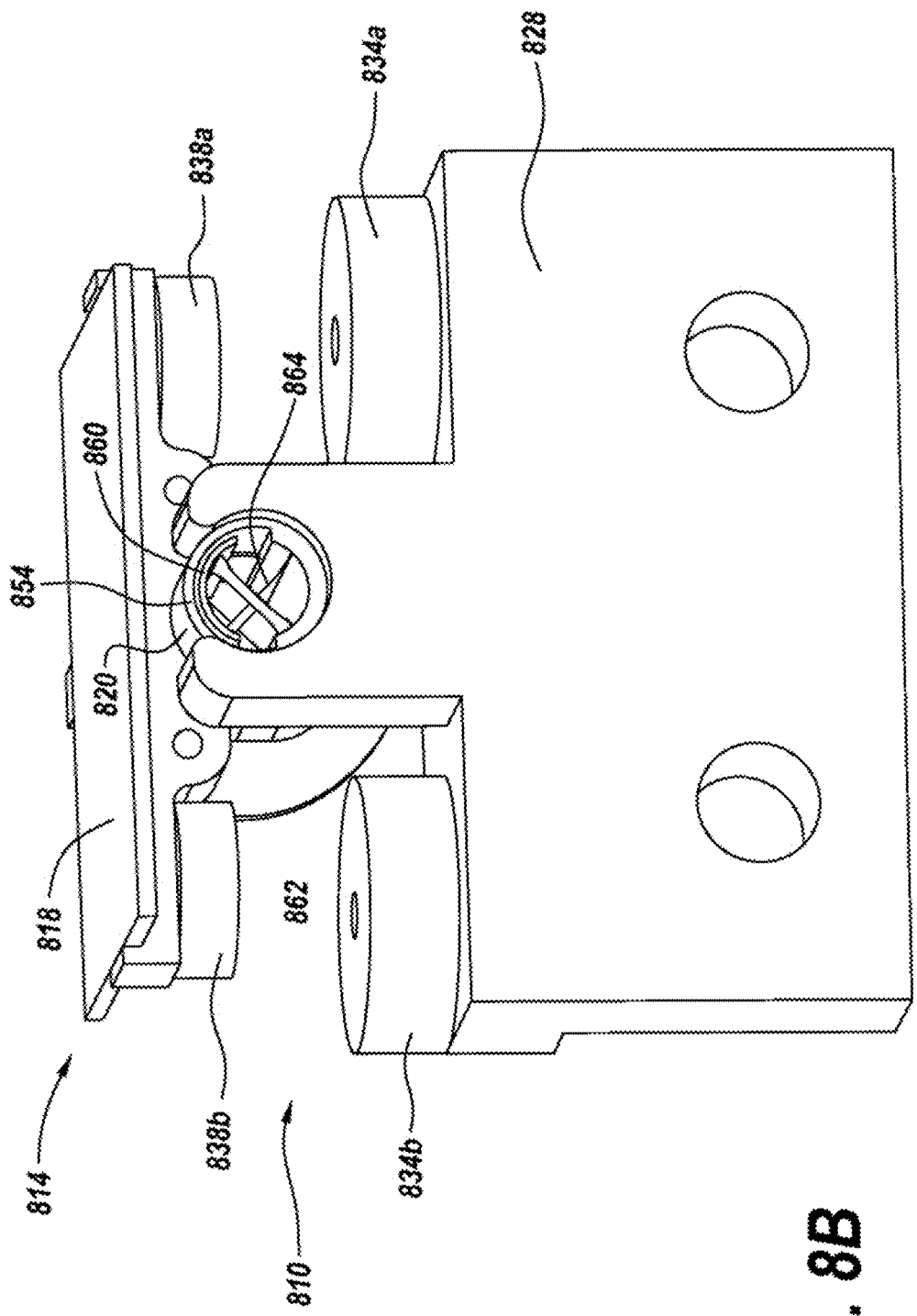

Referring now to FIG. 8a, perspective views of another embodiment of a scanning assembly for a detection system in accordance with the subject technology is shown generally at 810. The scanning assembly 810 functions similarly to the scanning assembly 210 except as otherwise described herein. In particular, the assembly 810 is configured to oscillate in only one direction for scanning. As with other embodiments, a scanning fixture 814 includes a reflective mirror 818 which is rotated to change the field of vision of a LiDAR system interacting with the scanning assembly 810. Two electromagnets 834a, 834b apply force to corresponding permanent magnets 838a, 838b affixed to the underside of the scanning fixture 814 to rotate the scanning mirror 818 around pivot 820. The scanning fixture 814 is attached to a first section 856 of the pivot 820, which attaches directly to the base 828, the base 828 in turn attaching the scanning assembly 810 to a vehicle.

Similar to other pivots discussed herein, the first section 856 (or first cylinder) of the pivot 820 includes an immovably attached arcuate section 860 which extends into the second section 854 (or second cylinder) of the pivot 820. The second section 854 likewise includes an immovably attached arcuate section 858 extending into the first section 856. The first and second sections 856, 854 are connected via the flexible sheets 862, 864 which connect between the arcuate sections 858, 860. As with other pivots, the flexible sheets 862, 864 flex in response to torsional force from rotation of the pivot 820, while resisting longitudinal and lateral separation of the pivot sections 854, 856.

Figure 9B:
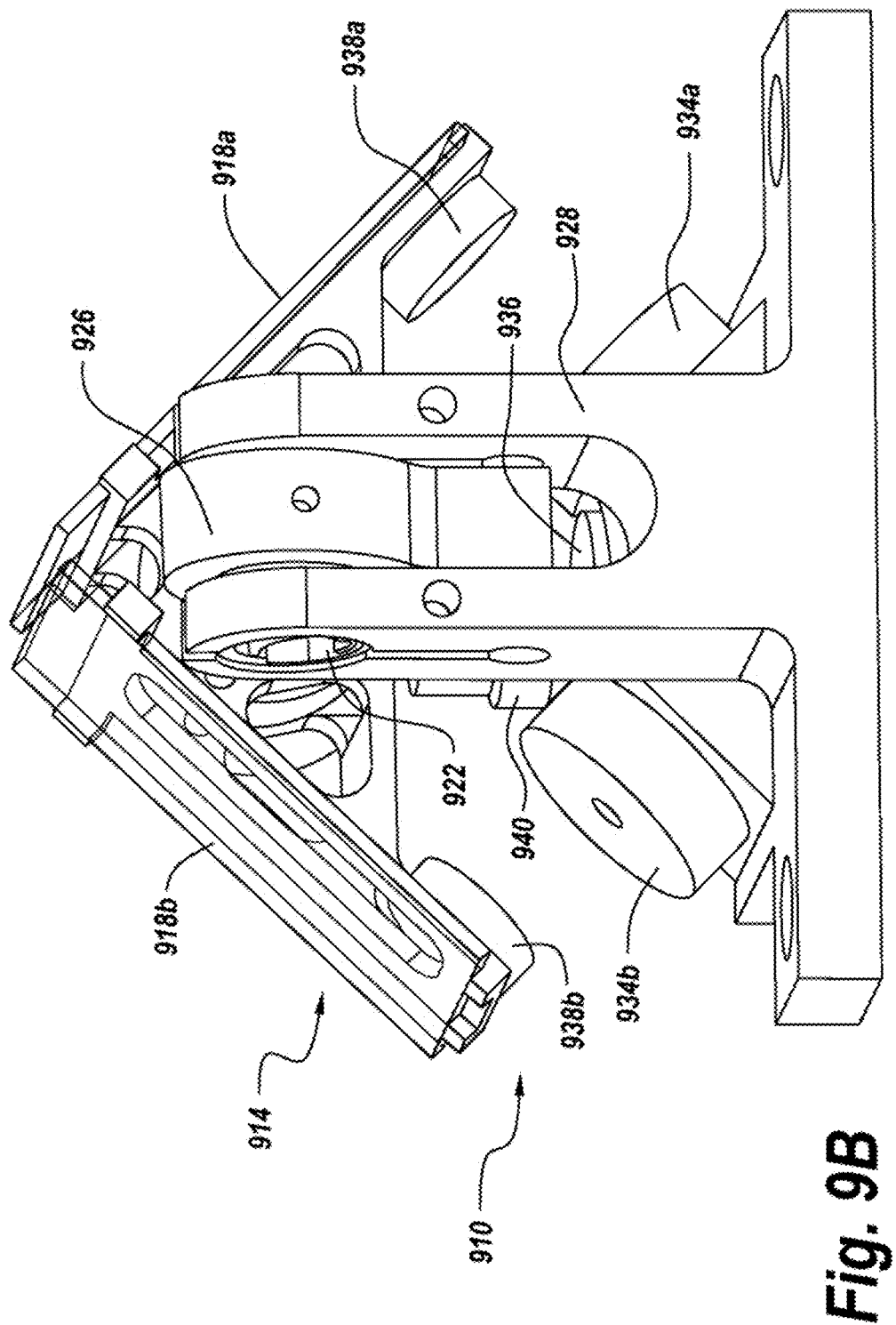

Referring now to FIG. 9a-9b, a perspective view of another embodiment of a scanning assembly for a detection system in accordance with the subject technology is shown generally at 910. The scanning assembly 910 functions similarly to the system 210 except as otherwise described herein. The main difference is that the scanning assembly 910 includes two scanning mirrors 918a, 918b (generally 918) rather than one. The two scanning mirrors 918 are arranged askew from one another to interact with at least two different LiDAR systems (i.e. two different light transmitter and receiver arrays) simultaneously. This increases the overall range and robustness of the corresponding detection system, as at least two different fields of vision are able to be picked up at the same time by the LiDAR systems interacting with the differently angled mirrors 918.

The mirrors 918 are attached to the scanning fixture 914 on opposing sides of the first pivot 920. Permanent magnets 938a, 938b are attached on the underside of the scanning fixture 914 adjacent to the first and second mirror 918a, 918b, respectively. The scanning fixture 914 rotates around first and second pivots 920, 922 (and therefore around the axes along which the pivots 920, 922 are elongated) as a unit. The mirrors 918, being attached to the scanning fixture 914, maintain a fixed relationship to one another as the fixture 914 rotates. The individual mirrors 918 do not rotate separately. Similarly to the system 210, two electromagnets 934a, 934b on the base interact with the respective permanent magnets 938a, 938b on either side of the first pivot 920 to effectuate scanning in the azimuth direction. Similarly, a third electromagnet 936 on the base 928 interacts with a permanent magnet 940 attached to the central member 926 to scan in the elevation direction. In this case, the elevation electromagnet 936 and permanent magnet 940 combination are arranged displaced vertically rather than horizontally as in the assembly 210 shown in FIG. 2a.

Like the system 210, the pivots 920, 922 also help isolate the mirrors 918 from unwanted forces from the vehicle. In particular, the scanning fixture 914 is attached to the first pivot 920 which is also attached to a first end of the central member 926. The pivot 920 is held elongated along the first axis for rotation around the first axis. The second end of the central member 926 is attached to the second pivot 922 to couple the first and second pivots 920, 922. The second pivot 922 is also attached to the base 928, the second pivot 922 being elongated along, and configured to rotate around, a second axis orthogonal to the first axis. As such, the scanning fixture 914 is coupled to the base 928 exclusively through attachment of the first pivot 920 to the second pivot 922 via the central member 926, the second pivot 922 in turn being attached to the base 928. Thus, force and vibration felt by the vehicle must pass through the first and second pivots 920, 922 before being felt by the mirrors 918. As with the system 210, rotation around the first and second axis changes the first of view of the detection system to accomplish scanning in the azimuth and elevation directions.

Referring now to FIGS. 10a-10e, a scanning assembly 1010 for a detection system for a vehicle is shown. The scanning assembly 1010 can be configured in accordance with the other scanning assemblies herein, except as otherwise shown and described. The scanning assembly 1010 can function as part of a detection system, such as the detection system 100, and allows for scanning the environment around a vehicle.

Figure 10A:
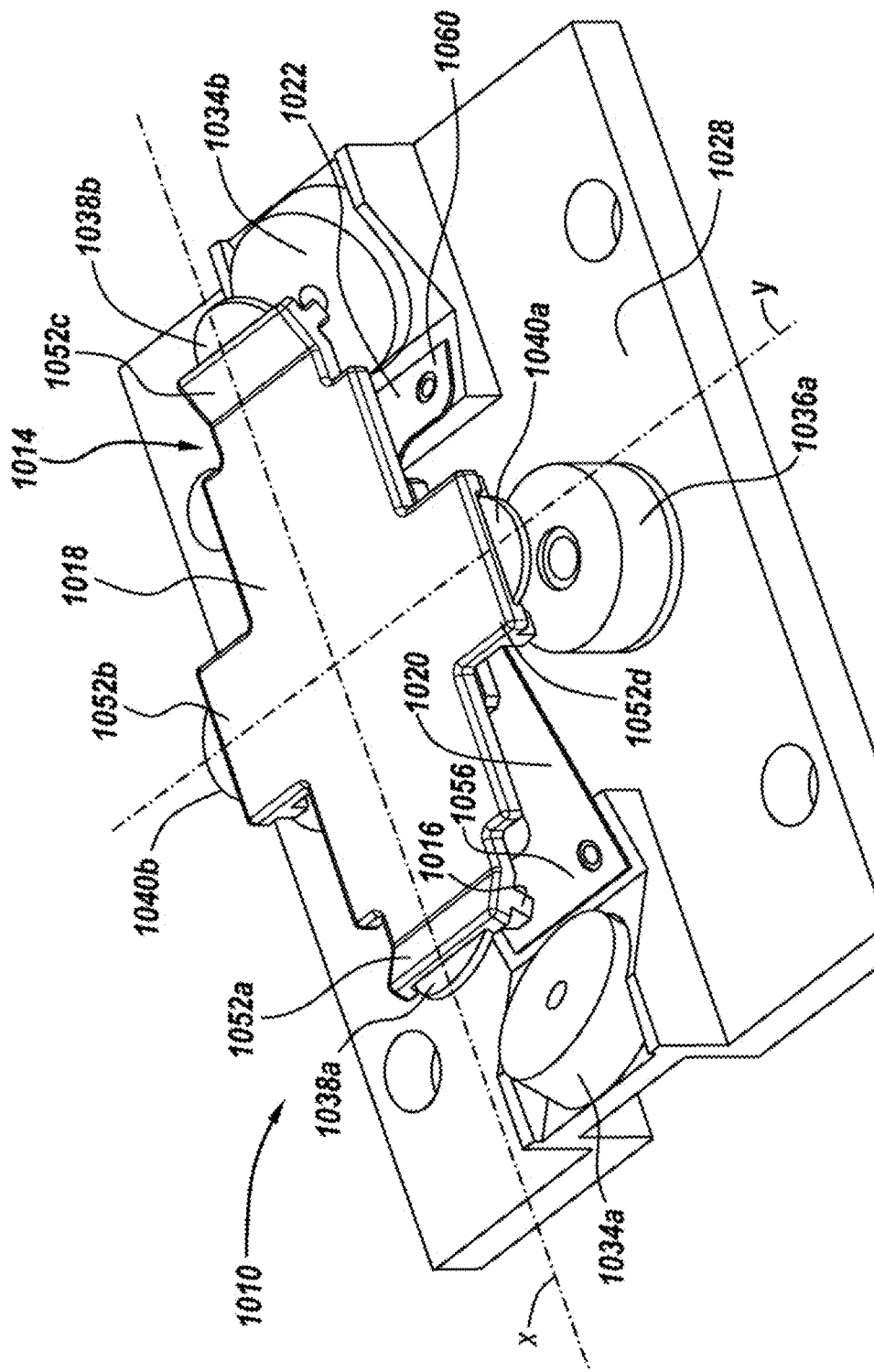
FIG. 10a is a top perspective view of another embodiment of a scanning assembly in accordance with the subject technology.
Figure 10B:
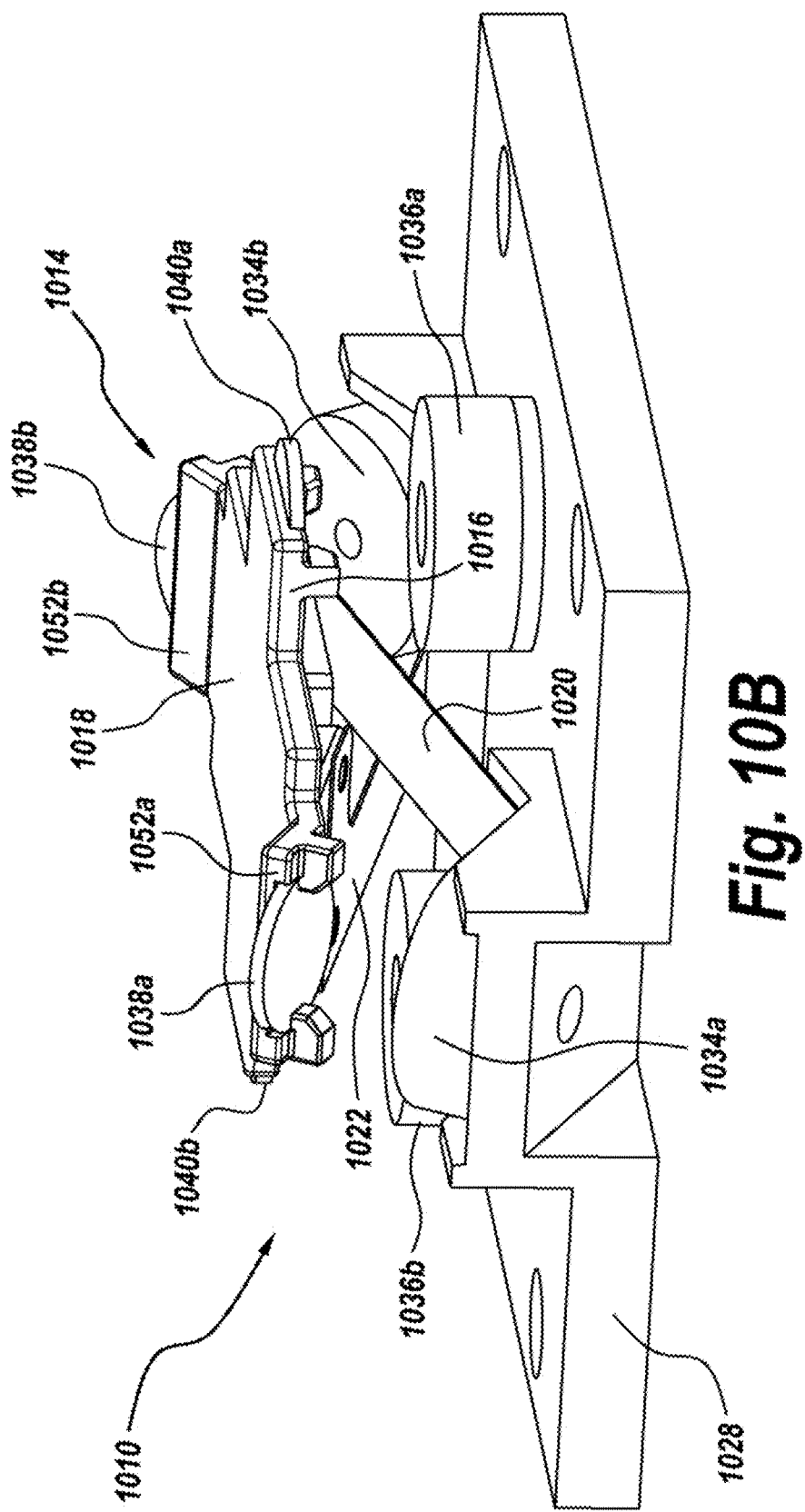
Figure 10C:
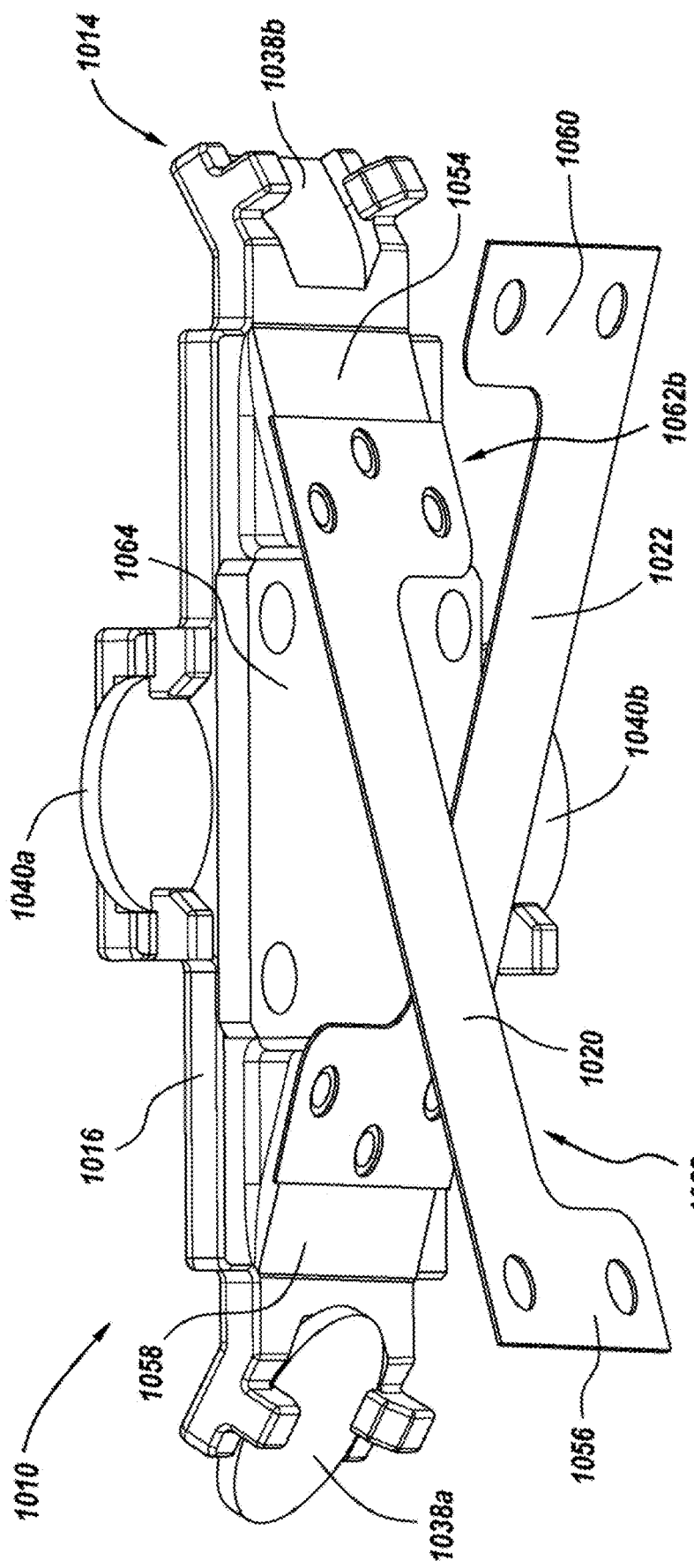

Referring now to FIGS. 10a-10c, perspective views of the scanning assembly 1010 are shown. FIG. 10a is an overhead perspective view of the scanning assembly 1010. FIG. 10b is a side perspective view of the scanning assembly 1010. FIG. 10c is a bottom perspective view of the scanning assembly 1010 with the base 1028 omitted to clearly illustrate other components.

The scanning assembly 1010 includes a scanning fixture 1014 with a frame 1016 and a reflective mirror 1018, which functions in accordance with other mirrors discussed herein. The reflective mirror 1018 is a generally flat planar surface which is held within the frame 1016. Reference axes x, y are illustrated central to and across the planar surface of the reflective mirror 1018. The frame 1016 also holds four permanent magnets 1038a, 1038b, 1040a, 1040b in place on separate sides 1052a, 1052b, 1052c, 1052d around the reflective mirror 1018. In general, the scanning fixture 1014 is configured to oscillate along the x and y axes, changing the angle of the reflective mirror 1018 for scanning an environment in azimuth and elevation, as discussed in more detail below.

The frame 1016 is attached directly to the base 1028 via two flexible sheets 1020, 1022, which form the exclusive mechanical path between the frame 1016 and the base 1028 (i.e. no separate parts mechanically connecting the frame 1016 and the base 1028). Each flexible sheet 1020, 1022 is substantially planar when at rest and extends between ends of the scanning fixture 1014 and base 1028. In particular, the first flexible sheet 1020 is planar between a first end 1054 and a second end 1056. The first end 1054 of the first flexible sheet 1020 is attached directly to the frame 1016 proximate one side 1052c of the scanning fixture 1014 while the second end 1056 of the first flexible sheet 1020 attaches to the base 1028 offset from an opposite side 1052a of the scanning fixture 1014. In this way, the flexible sheet 1020 is elongated along the x axis and attaches to the scanning fixture 1014 and base 1028 on opposite sides of the y axis. Likewise the second flexible sheet 1022 is planar between a first end 1058 and a second end 1060. The first end 1058 of the second flexible sheet 1022 is attached directly to the frame 1016 proximate the side 1052*a* of the scanning fixture 1014 above the second end 1056 of the first flexible sheet 1020. The second end 1060 of the second flexible sheet 1022 is attached directly to the base 1028 on the opposite side of the base 1028, offset from the opposite side 1052*c* of the scanning fixture 1014 (and below the first end 1054 of the first flexible sheet 1020). Thus, the second flexible sheet 1022 is also elongated along the x axes, attaching to the scanning fixture 1014 and base 1028 on opposite sides of they axis.

Each flexible sheet 1020, 1022 resists movement in the planar direction of the sheet 1020, 1022, preventing direct movement of the base 1028 with respect to the scanning fixture 1014 in the direction of the x and y axis. However, each sheet 1020, 1022 is thin orthogonal to its plane, making the sheets 1020, 1022 flexible and able to bend in torsion and allowing the scanning fixture 1014 to rotate around the x and y axes. Further, each flexible sheet 1020, 1022 includes a central cutout region 1062*a*, 1062*b* between ends which allows the flexible sheets 1020, 1022 to cross one another, and also allows for more torsional flexing around the central region of each sheet 1020, 1022. In some cases, the central cutout regions 1062*a*, 1062*b* of each flexible sheet 1020, 1022 can have a planar width that is substantially half, or less than half, the width of the ends 1054, 1056, 1058, 1060 of each flexible sheet 1020, 1022.

Oscillation of the scanning fixture 1014 is driven by solenoids of the electromagnets 1034*a*, 1034*b*, 1036*a*, 1036*b* generating a magnetic field which interacts with opposing corresponding permanent magnets 1038*a*, 1038*b*, 1040*a*, 1040*b* to cause a force to act therebetween. In the example given, all permanent magnets 1038*a*, 1038*b*, 1040*a*, 1040*b* are attached to the scanning fixture 1014, while all electromagnets 1034*a*, 1034*b*, 1036*a*, 1036*b* are attached to the base 1028. Each electromagnet 1034*a*, 1034*b*, 1036*a*, 1036*b* generates a magnetic field in response to an applied voltage or current that interacts with the corresponding permanent magnet 1038*a*, 1038*b*, 1040*a*, 1040*b*, applying a force to selectively push or pull the permanent magnet 1038*a*, 1038*b*, 1040*a*, 1040*b* causing rotation of the scanning fixture as described in more detail below.

Figure 10D:
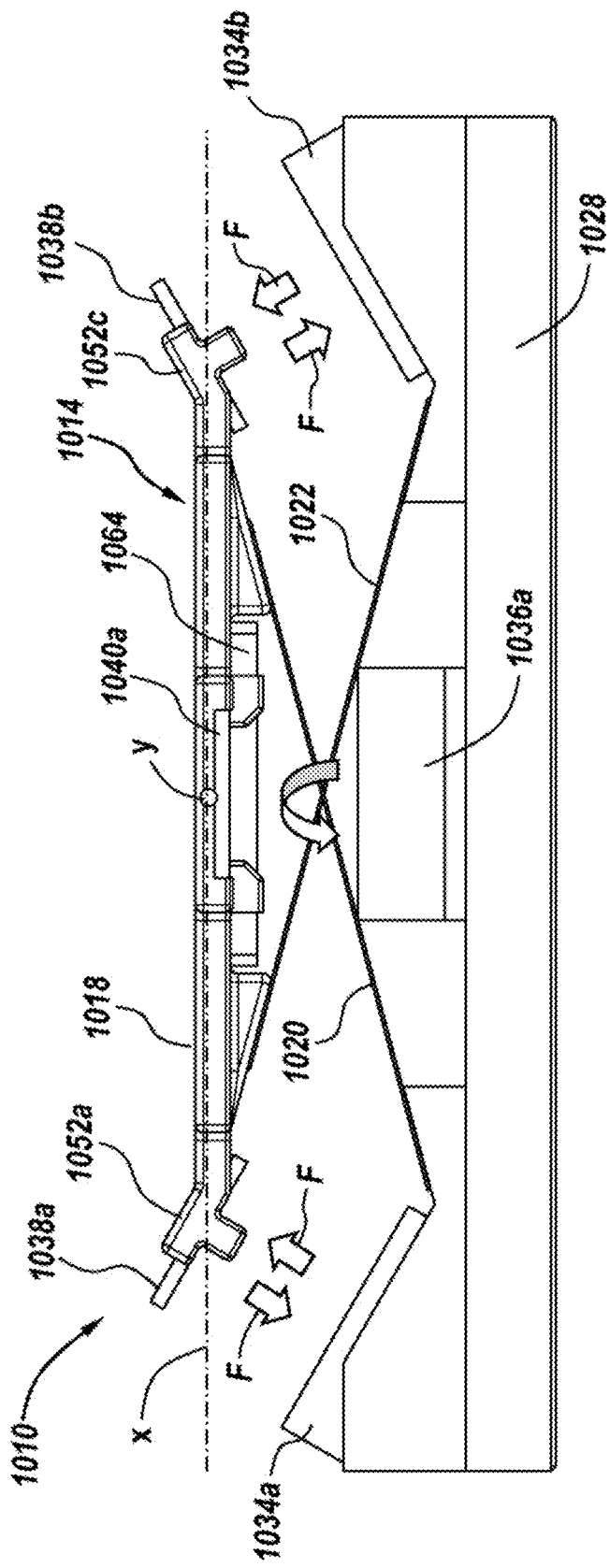
Figure 10E:
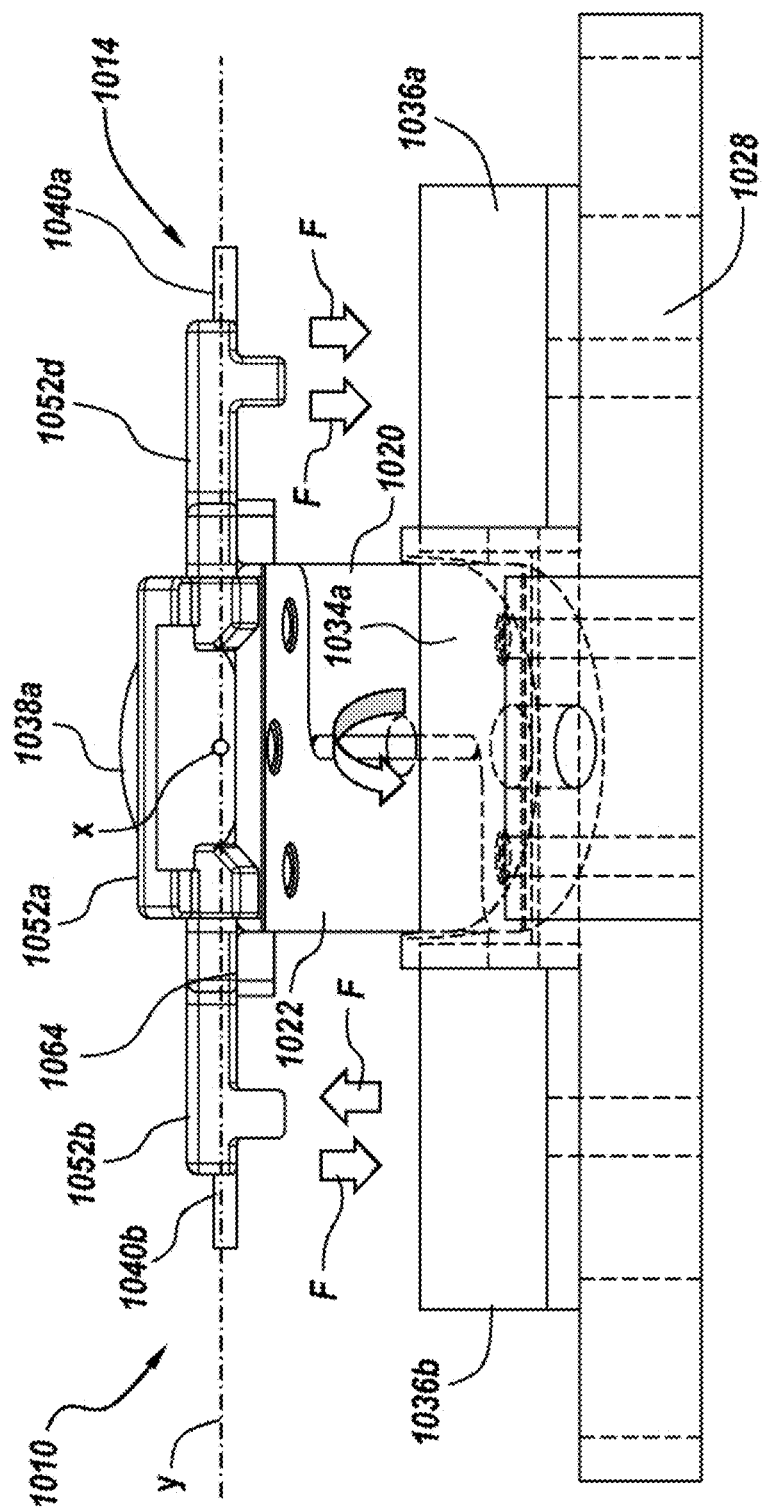

Referring now to FIGS. 10*d*, 10*e*, front and left side views of the scanning assembly 1010, respectively, are shown. Force arrows "F" are included to illustrate exemplary force between electromagnets 1034*a*, 1034*b*, 1036*a*, 1036*b* and permanent magnets 1038*a*, 1038*b*, 1040*a*, 1040*b* which controls oscillation of the scanning fixture 1014 when scanning the environment.

In particular, FIG. 10*d* shows the force F which results in oscillation of the scanning fixture 1014 around the "y" axis. Electromagnets 1034*a*, 1034*b* are proximate to and offset from corresponding permanent magnets 1038*a*, 1038*b*. Force F from electromagnet 1034*a* acts to push or pull the corresponding permanent magnet 1038*a*, while force F from electromagnet 1034*b* acts to push or pull the corresponding permanent magnet 1038*b*. Notably, in the embodiment shown, the permanent magnets 1038*a*, 1038*b* are fixed to the scanning fixture 1014 at angled ends 1052*a*, 1052*c*, which are angled upwards from (i.e. not parallel to) the planar reflective mirror 1018. These ends 1052*a*, 1052*c* hold the permanent magnets 1038*a*, 1038*b* similarly angled. Corresponding electromagnets 1034*a*, 1034*b* are then also held at an angle by the base 1028, such that the surface of each electromagnet 1034*a*, 1034*b* is parallel to the corresponding permanent magnet 1038*a*, 1038*b*. This allows for a more normal force between the electromagnets 1034*a*, 1034*b* and permanent magnets 1038*a*, 1038*b* during scanning. Typically, the scanning assembly 1010 is configured and arranged such that oscillating around the y axis shown herein results in an azimuth scan of the surrounding environment. In some cases, each oscillation around the y axis can result in a change of the angle of the surface of the reflective mirror 1018 of between −15 and 15 degrees and can be carried out at a frequency of between 10-20 Hz.

FIG. 10*e* shows the force F which results in oscillation of the scanning fixture 1014 around the "x" axis. Electromagnets 1036*a*, 1036*b* are proximate to and offset from corresponding permanent magnets 1040*a*, 1040*b*. Force F from electromagnet 1036*a* acts to push or pull the corresponding permanent magnet 1040*a*, while force F from electromagnet 1036*b* acts to push or pull the corresponding permanent magnet 1040*b*. Each permanent magnet 1040*a*, 1040*b* is positioned directly above and parallel to the corresponding electromagnet 1036*a*, 1036*b*. The scanning assembly 1010 is typically configured and arranged such that oscillating around the x axis shown herein results in an elevation scan of the surrounding environment. In some cases, the scanning assembly 1010 can be configured and arranged such that oscillating around the x axis shown herein results in an elevation scan of the surrounding environment. Further, oscillation around the x axis (i.e. in elevation) can be faster than oscillation around the y axis (i.e. in azimuth) and cover a smaller range. In some cases, each oscillation around the x axis can result in a change of the angle of the surface of the reflective mirror 1018 of between −5 and 5 degrees and can be carried out at a frequency of between 100-200 Hz. The scanning assembly 1010 can be configured such that a ratio of the oscillation frequency around the x axis to the oscillation frequency around the y axis produces a Lissajou pattern.

In general, the y axis through the central width of the flexible sheets 1020, 1022. Therefore, when the scanning fixture 1014 oscillates around the y axis, the flexible sheets 1020, 1022 are each forced to flex along their length between ends (i.e. across the length of the plane formed by the sheet 1020, 1022). By contrast, rotation around the x across causing twisting across the plane of each flexible sheet 1020, 1022, resulting in torsional force on each sheet 1020, 1022. In the case of oscillation across around either axis, the flexible sheets 1020, 1022 are designed to provide some resistance to the oscillation which also provides a return force (i.e. urging the scanning fixture 1014 back towards its rest position) as the scanning fixture 1014 oscillates. Further, the flexible sheets 1020, 1022 provide the sole means of connection, and sole mechanical path, between the scanning fixture 1014 and the base 1028 which connects to the vehicle. The flexible nature of the sheets 1020, 1022 therefore allows the scanning assembly 1010 to avoid feeling the full effect of all bumps, vibrations, and other sources of interference felt by the vehicle, as the flexible sheets 1020, 1022 are able to absorb at least some of the interference before it effects the position or movement of the scanning fixture 1014.

It should be understood that the number of electromagnets and permanent magnets, and exact positioning of each, can vary in different embodiments, and the embodiments shown in described herein are exemplary only.

In some cases, the scanning assembly 1010 can also include one or more accelerometers 1064 (as best shown within a shared housing in FIG. 10c). Instantaneous and precise position of the scanning fixture 1010 and mirror 1018 can be determined by analysis of signals from the accelerometers 1064. By way of example, two accelerometers 1064 can be included, with a first accelerometer 1064 configured to track acceleration of the scanning fixture 1014 in a direction indicative of oscillation around the x axis (e.g. for scanning in elevation). A second accelerometer 1064 can be configured to track acceleration of the scanning fixture 1014 in a direction indicative of oscillation around the y axis (e.g. for scanning in azimuth). Based on data from the first and second accelerometers 1064, the scanning assembly 1010 can then measure oscillation around the x and y axis and record a current position of the scanning fixture 1014, or report to a user or other devices (not shown herein) for further data processing and/or storage.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. drives, transmitters, receivers, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A scanning assembly for a detection system for a vehicle, comprising:
    a base configured to attach the scanning assembly to the vehicle;
    a scanning fixture including a mirror having a reflective surface, the mirror having a first central axis and a second central axis running orthogonal to the first central axis;
    a first flexible sheet extending along a first plane between a first end and a second end of the first flexible sheet, the first end attached to the scanning assembly on a first side of the first central axis and the second end attached to the base on a second side of the first central axis, the second side opposite the first side; and
    a second flexible sheet elongated along a second plane between a third end and a fourth end of the second flexible sheet, the third end attached to the scanning assembly on the second side of the first central axis and the fourth end attached to the base on the first side of the first central axis,
    wherein:
    the first flexible sheet is configured to flex along the first plane when the scanning assembly oscillates around the first central axis;
    the second flexible sheet is configured to flex, independent of the first flexible sheet, along the second plane when the scanning assembly oscillates around the first central axis; and
    the first flexible sheet and the second flexible sheet are elongated in the direction of the second central axis such that the first flexible sheet and second flexible sheet flex in torsion when the scanning assembly oscillates around the second central axis.

2. The scanning assembly of claim 1, wherein the first flexible sheet includes a first central cutout region and the second flexible sheet includes a second central cutout region aligned with the first central cutout region of the first flexible sheet.

3. The scanning assembly of claim 2, wherein:
    the first central cutout region of the first flexible sheet has a planar width less than or equal to half a width of the first end of the first flexible sheet; and
    the second central cutout region of the second flexible sheet has a planar width less than or equal to half a width of the third end of the second flexible sheet.

4. The scanning assembly of claim 1, wherein the scanning assembly is configured to operate is a resonant mode such that:
    the mirror oscillates at a first oscillation frequency around the first central axis to change a first angle of the reflective surface between −15 degrees and 15 degrees, the first oscillation frequency being in the range of 10-20 Hz; and
    the mirror oscillates at a second oscillation frequency around the second central axis to change a second angle of the reflective surface between −5 degrees and 5 degrees, the second oscillation frequency being in the range of 100-200 Hz.

5. A scanning assembly for a detection system for a vehicle, comprising:
    a base configured to attach the scanning assembly to the vehicle;
    a scanning fixture including:
        a mirror having a reflective surface;
        a first permanent magnet coupled to the mirror on a first side of a first central axis;
        a second permanent magnet coupled to the mirror on a second side of the first central axis, the second side opposite the first side;
        a third permanent magnet coupled to the mirror on a third side of a second central axis, the second central axis orthogonal to the first central axis; and
        a fourth permanent magnet coupled to the mirror on a fourth side of the second central axis, the fourth side opposite the third side;
    a first electromagnet attached to the base and configured to apply a force to the first permanent magnet to selectively push or pull the scanning fixture such that the mirror oscillates around the first central axis;
    a second electromagnet attached to the base and configured to apply a force to the second permanent magnet to selectively push or pull the scanning fixture such that the mirror oscillates around the first central axis;
    a third electromagnet attached to the base and configured to apply a force to the third permanent magnet to selectively push or pull the scanning fixture such that the mirror oscillates around the second central axis;
    a fourth electromagnet attached to the base and configured to apply a force to the fourth permanent magnet to selectively push or pull the scanning fixture such that the mirror oscillates around the second central axis;
    a first flexible sheet elongated along a first plane between a first end and a second end of the first flexible sheet, the first end attached to the scanning fixture and the second end attached to the base; and a second flexible sheet elongated along a second plane between a third end and a fourth end of the first flexible sheet, the third end attached to the scanning fixture and the fourth end attached to the base, wherein the second flexible sheet is configured to flex independently of the first flexible sheet.

6. The scanning assembly of claim 5, wherein:
the first flexible sheet is attached to the scanning fixture on the first side of the first central axis and to the base on the second side of the first central axis such that the first flexible sheet flexes along the first plane when the scanning fixture oscillates around the first central axis; and
the second flexible sheet is attached to the scanning fixture on the second side of the first central axis and to the base on the first side of the first central axis such that the second flexible sheet flexes along the second plane when the scanning fixture oscillates around the first central axis.

7. The scanning assembly of claim 6, wherein the first flexible sheet and the second flexible sheet are elongated in the direction of the second central axis such that the first flexible sheet and second flexible sheet flex in torsion when the scanning fixture oscillates around the second central axis.

8. The scanning assembly of claim 5, wherein the scanning assembly is configured to operate is a resonant mode such that:
the mirror oscillates at a first oscillation frequency around the first central axis to change a first angle of the reflective surface between −15 degrees and 15 degrees, the first oscillation frequency being in the range of 10-20 Hz; and
the mirror oscillates at a second oscillation frequency around the second central axis to change a second angle of the reflective surface between −5 degrees and 5 degrees, the second oscillation frequency being in the range of 100-200 Hz.

9. The scanning assembly of claim 5, wherein:
the scanning fixture is configured to oscillate the mirror at a first frequency around the first central axis and at a second frequency around the second central axis; and
the scanning assembly further comprises a first accelerometer configured to measure oscillation of the mirror around the first central axis and a second accelerometer configured to measure oscillation of the mirror around the second central axis.

10. The scanning assembly of claim 5, wherein:
the scanning fixture is configured to hold the first permanent magnet and the second permanent magnet at an angle with respect to the mirror; and
a surface of the first electromagnet is parallel to the first permanent magnet and a surface of the second electromagnet is parallel to the second permanent magnet.

11. The scanning assembly of claim 5, wherein the first flexible sheet includes a first central cutout region and the second flexible sheet includes a second central cutout region aligned with the first central cutout region of the first flexible sheet.

12. The scanning assembly of claim 11, wherein:
the first central cutout region of the first flexible sheet has a planar width less than or equal to half a width of the first end of the first flexible sheet; and
the second central cutout region of the second flexible sheet has a planar width less than or equal to half a width of the third end of the second flexible sheet.

13. A scanning assembly for a detection system for a vehicle, comprising:
a base configured to attach the scanning assembly to the vehicle;
a scanning fixture including a mirror having a reflective surface, the mirror having a first central axis and a second central axis running orthogonal to the first central axis;
a first flexible sheet directly connected to the base and the scanning fixture; and
a second flexible sheet directly connected to the base and the scanning fixture,
wherein:
oscillation of the mirror around the first central axis causes the first flexible sheet to flex along a length of a plane formed by the first flexible sheet and the second flexible sheet to flex along a length of a plane formed by the second flexible sheet, the second flexible sheet flexing independently of the first flexible sheet; and
oscillation of the mirror around the second central axis causes the first flexible sheet and the second flexible sheet to flex in torsion.

14. The scanning assembly of claim 13, wherein the first flexible sheet and the second flexible sheet, exclusively, form a mechanical path between the base and the scanning fixture.

15. The scanning assembly of claim 13, wherein the scanning assembly is configured to operate is a resonant mode such that:
the mirror oscillates at a first oscillation frequency around the first central axis to change a first angle of the reflective surface between −15 degrees and 15 degrees, the first oscillation frequency being in the range of 10-20 Hz; and
the mirror oscillates at a second oscillation frequency around the second central axis to change a second angle of the reflective surface between −5 degrees and 5 degrees.

* * * * *